US012688430B1

(12) United States Patent (10) Patent No.: US 12,688,430 B1

Petersen (45) Date of Patent: Jul. 21, 2026

(54) TRAINING APPARATUS WITH INTEGRATED CIRCUITS FOR TRAINING LOGIC GATE NETWORKS

(71) Applicant: Felix Petersen, Santa Clara, CA (US)

(72) Inventor: Felix Petersen, Santa Clara, CA (US)

(73) Assignee: DiffLogic Inc., Dover, DE (US)

( * ) Notice: Subject to any disclaimer, the term of this patent is extended or adjusted under 35 U.S.C. 154(b) by 0 days.

(21) Appl. No.: 19/404,002

(22) Filed: Dec. 1, 2025

Related U.S. Application Data

(60) Provisional application No. 63/927,929, filed on Nov. 30, 2025, provisional application No. 63/772,329, filed on Mar. 14, 2025, provisional application No. 63/772,339, filed on Mar. 14, 2025.

(51) Int. Cl.
*G06N 3/084* (2023.01)
*G06N 3/063* (2023.01)

(52) U.S. Cl.
CPC ............. *G06N 3/084* (2013.01); *G06N 3/063* (2013.01)

(58) Field of Classification Search
CPC ................................ G06N 3/084; G06N 3/063
See application file for complete search history.

(56) References Cited

FOREIGN PATENT DOCUMENTS

WO WO-2025240550 A1 * 11/2025 ............... G06N 5/01

OTHER PUBLICATIONS

Ramírez, Iván, Francisco J. Garcia-Espinosa, David Concha, and Luis Alberto Aranda. "Logic Neural Networks for Efficient FPGA Implementation." IEEE Transactions on Circuits and Systems I: Regular Papers (2024). (Year: 2024).*

Yue, Chang, and Niraj K. Jha. "Learning interpretable differentiable logic networks." IEEE Transactions on Circuits and Systems for Artificial Intelligence (2024). (Year: 2024).*

Petersen, Felix, Hilde Kuehne, Christian Borgelt, Julian Welzel, and Stefano Ermon. "Convolutional differentiable logic gate networks." Advances in Neural Information Processing Systems 37 (2024): 121185-121203. (Year: 2024).*

Petersen, Felix, Christian Borgelt, Hilde Kuehne, and Oliver Deussen. "Deep differentiable logic gate networks." Advances in Neural Information Processing Systems 35 (2022): 2006-2018. (Year: 2022).*

* cited by examiner

*Primary Examiner* — Casey R. Garner
(74) *Attorney, Agent, or Firm* — PCFB, LLC; Justin K. Flanagan

(57) ABSTRACT

The disclosure describes integrated circuits and training apparatuses for efficiently training learnable logic networks. One or more hardware-implemented learnable logic engines execute forward and backward propagation through differentiable relaxations of Boolean logic gates arranged in configurable clusters. Each engine processes multiple inputs and outputs with shared parameter sets, supports variable numbers of gate inputs, and may reuse locally stored parameters across batched samples to reduce memory bandwidth. Engines and associated cores employ mixed-precision arithmetic, including low-precision activations and higher-precision gradients with on-chip gradient accumulation. Configurable interconnects route activations between engines, and topology bits select among logic operations and wiring options. Systems including a host processor orchestrate the use of the learnable logic engines to design fixed logic gate networks for efficient inference.

49 Claims, 29 Drawing Sheets

---

100 Example Embodiment of the Training Apparatus.

110 Memory for storing parameters and activations.

120 One or more hardware implemented instruction(s) / dataflow(s) for forwarding and backpropagating through a relaxation of one or more logic gates.

130 Arithmetic units suitable for applying optimization algorithms to the parameters.

140 Communication interface.

<u>100</u>    Example Embodiment of the Training Apparatus.

<u>110</u>    Memory for storing parameters and activations.

<u>120</u>    One or more hardware implemented instruction(s) / dataflow(s) for forwarding and backpropagating through a relaxation of one or more logic gates.

<u>130</u>    Arithmetic units suitable for applying optimization algorithms to the parameters.

<u>140</u>    Communication interface.

FIG. 1

310
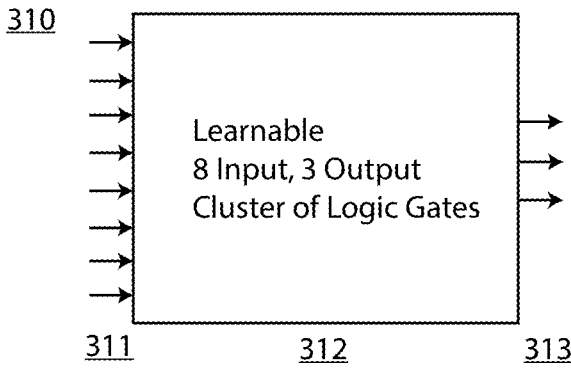
311        312        313
320
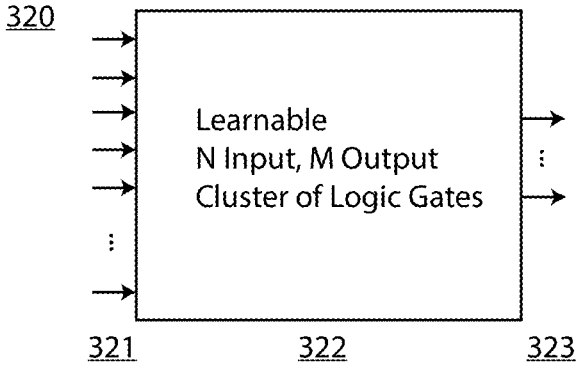
321        322        323
FIG. 3

500    510    520    530    550    560    570    580

Figure 6:
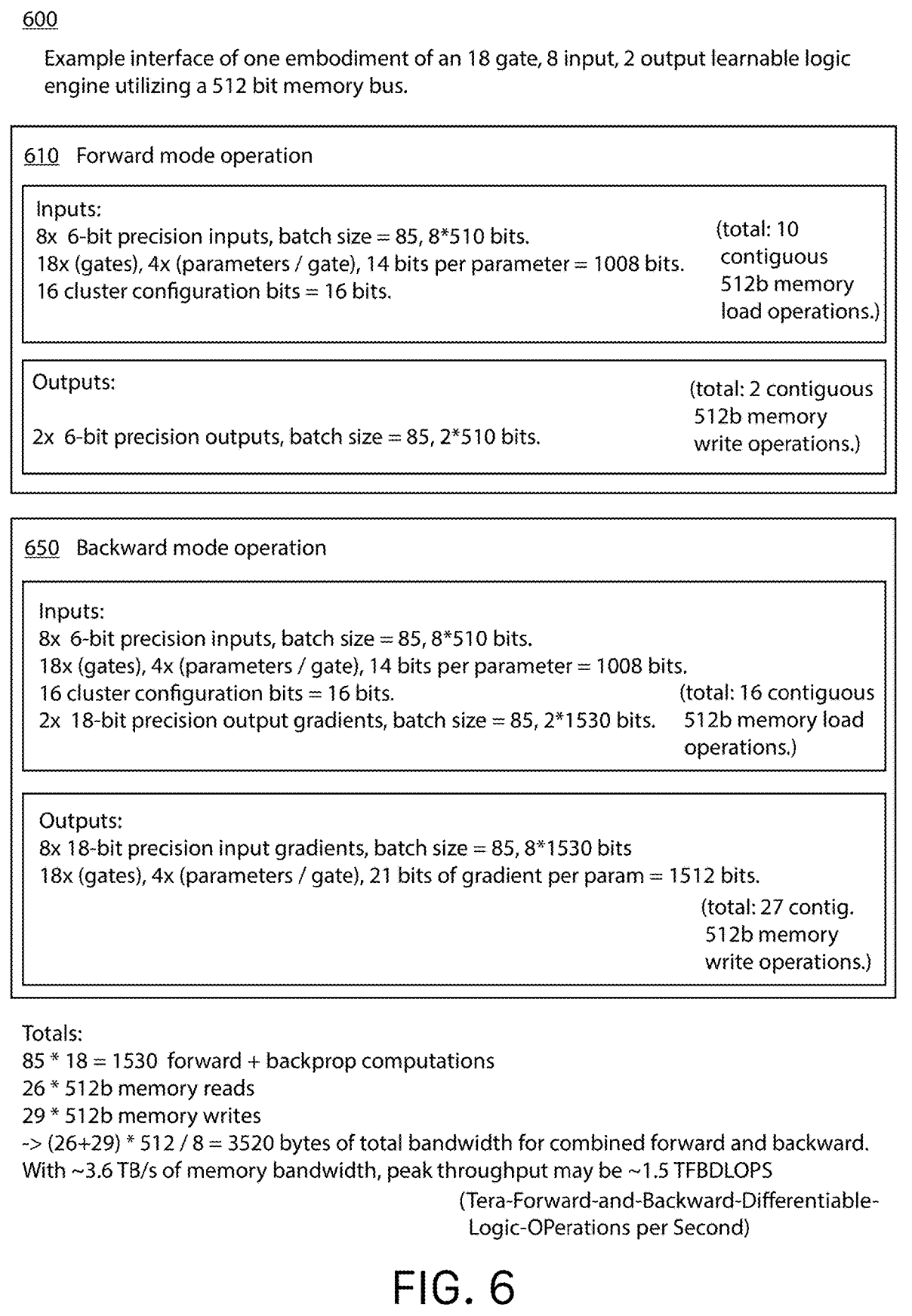

600

Example interface of one embodiment of an 18 gate, 8 input, 2 output learnable logic engine utilizing a 512 bit memory bus.

---

610   Forward mode operation

Inputs:
8x  6-bit precision inputs, batch size = 85, 8*510 bits.
18x (gates), 4x (parameters / gate), 14 bits per parameter = 1008 bits.
16 cluster configuration bits = 16 bits.

(total: 10 contiguous 512b memory load operations.)

Outputs:

2x  6-bit precision outputs, batch size = 85, 2*510 bits.

(total: 2 contiguous 512b memory write operations.)

---

650   Backward mode operation

Inputs:
8x  6-bit precision inputs, batch size = 85, 8*510 bits.
18x (gates), 4x (parameters / gate), 14 bits per parameter = 1008 bits.
16 cluster configuration bits = 16 bits.
2x  18-bit precision output gradients, batch size = 85, 2*1530 bits.

(total: 16 contiguous 512b memory load operations.)

Outputs:
8x 18-bit precision input gradients, batch size = 85, 8*1530 bits
18x (gates), 4x (parameters / gate), 21 bits of gradient per param = 1512 bits.

(total: 27 contig. 512b memory write operations.)

---

Totals:
85 * 18 = 1530  forward + backprop computations
26 * 512b memory reads
29 * 512b memory writes
-> (26+29) * 512 / 8 = 3520 bytes of total bandwidth for combined forward and backward.
With ~3.6 TB/s of memory bandwidth, peak throughput may be ~1.5 TFBDLOPS (Tera-Forward-and-Backward-Differentiable-Logic-OPerations per Second)

Figure 7:
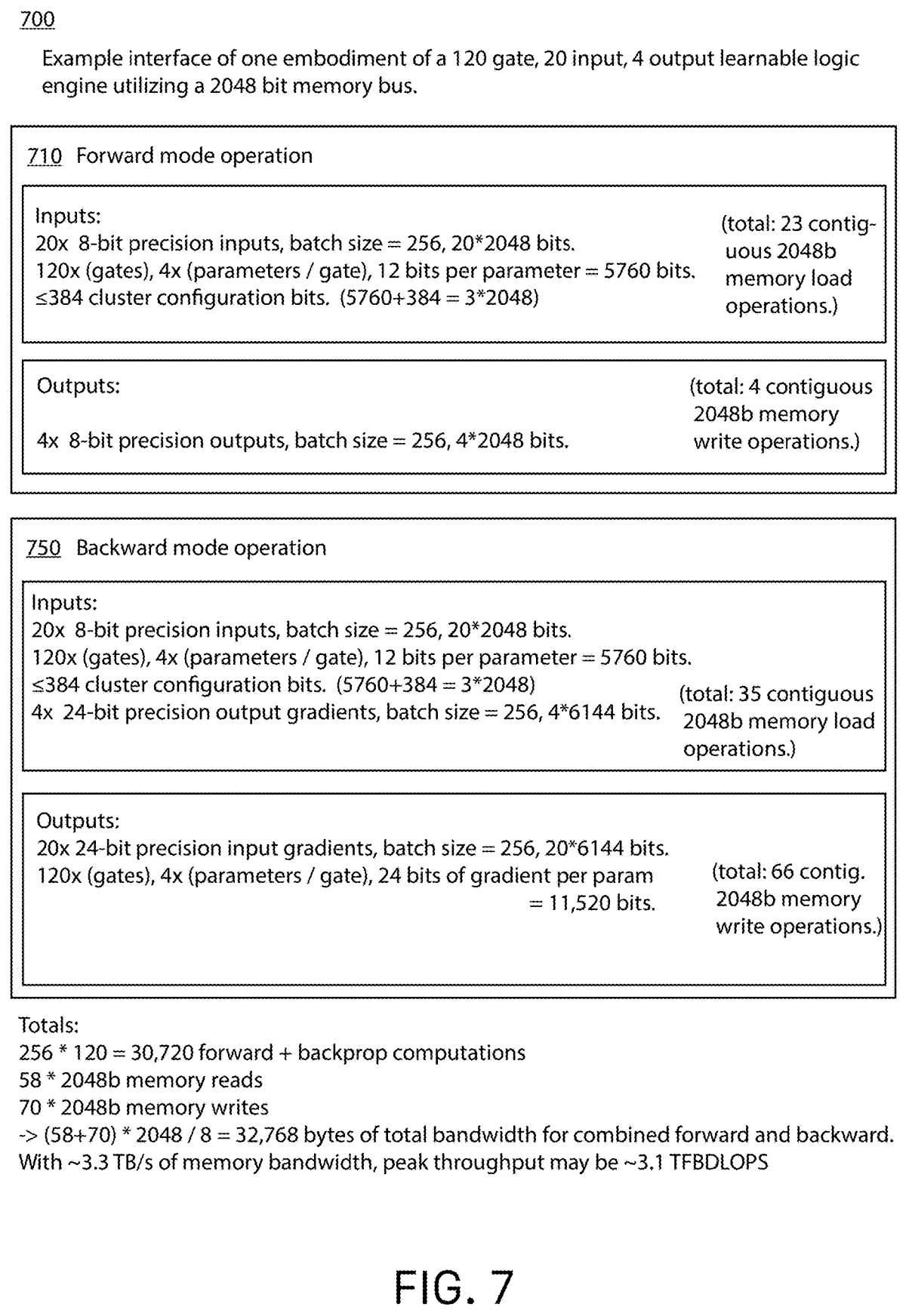

Example interface of one embodiment of a 120 gate, 20 input, 4 output learnable logic engine utilizing a 2048 bit memory bus.

710    Forward mode operation

Inputs:
20x  8-bit precision inputs, batch size = 256, 20*2048 bits.
120x (gates), 4x (parameters / gate), 12 bits per parameter = 5760 bits.
≤384 cluster configuration bits.  (5760+384 = 3*2048)

(total: 23 contig-uous 2048b memory load operations.)

Outputs:

4x  8-bit precision outputs, batch size = 256, 4*2048 bits.

(total: 4 contiguous 2048b memory write operations.)

750    Backward mode operation

Inputs:
20x  8-bit precision inputs, batch size = 256, 20*2048 bits.
120x (gates), 4x (parameters / gate), 12 bits per parameter = 5760 bits.
≤384 cluster configuration bits.  (5760+384 = 3*2048)
4x  24-bit precision output gradients, batch size = 256, 4*6144 bits.

(total: 35 contiguous 2048b memory load operations.)

Outputs:
20x 24-bit precision input gradients, batch size = 256, 20*6144 bits.
120x (gates), 4x (parameters / gate), 24 bits of gradient per param
= 11,520 bits.

(total: 66 contig. 2048b memory write operations.)

Totals:
256 * 120 = 30,720 forward + backprop computations
58 * 2048b memory reads
70 * 2048b memory writes
-> (58+70) * 2048 / 8 = 32,768 bytes of total bandwidth for combined forward and backward.
With ~3.3 TB/s of memory bandwidth, peak throughput may be ~3.1 TFBDLOPS

Figure 8:
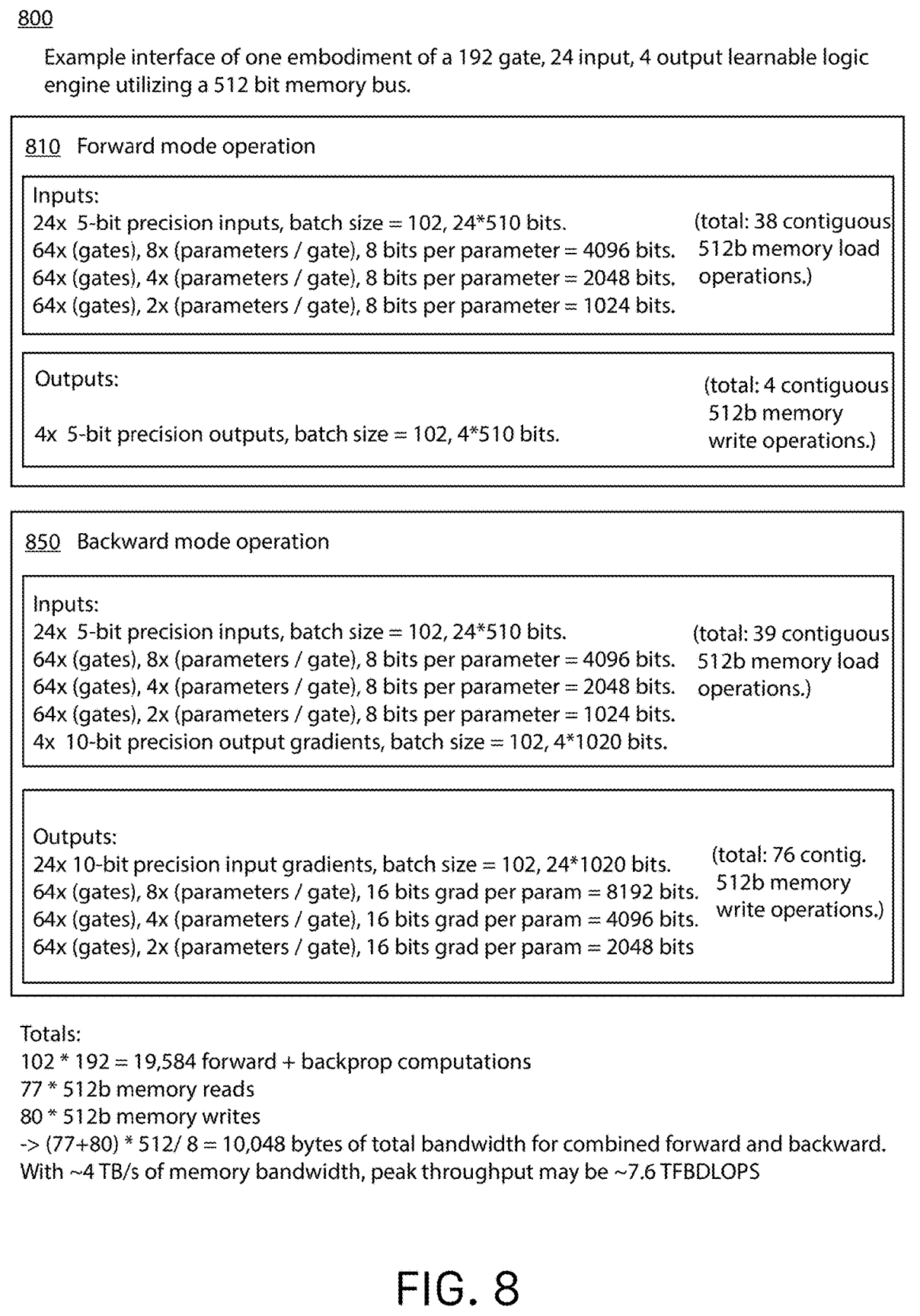

Example interface of one embodiment of a 192 gate, 24 input, 4 output learnable logic engine utilizing a 512 bit memory bus.

---

810   Forward mode operation

Inputs:
24x  5-bit precision inputs, batch size = 102, 24*510 bits.                    (total: 38 contiguous
64x (gates), 8x (parameters / gate), 8 bits per parameter = 4096 bits.   512b memory load
64x (gates), 4x (parameters / gate), 8 bits per parameter = 2048 bits.   operations.)
64x (gates), 2x (parameters / gate), 8 bits per parameter = 1024 bits.

Outputs:                                                                       (total: 4 contiguous
                                                                               512b memory
4x  5-bit precision outputs, batch size = 102, 4*510 bits.                     write operations.)

---

850   Backward mode operation

Inputs:
24x  5-bit precision inputs, batch size = 102, 24*510 bits.                    (total: 39 contiguous
64x (gates), 8x (parameters / gate), 8 bits per parameter = 4096 bits.   512b memory load
64x (gates), 4x (parameters / gate), 8 bits per parameter = 2048 bits.   operations.)
64x (gates), 2x (parameters / gate), 8 bits per parameter = 1024 bits.
4x  10-bit precision output gradients, batch size = 102, 4*1020 bits.

Outputs:
24x 10-bit precision input gradients, batch size = 102, 24*1020 bits.          (total: 76 contig.
64x (gates), 8x (parameters / gate), 16 bits grad per param = 8192 bits.  512b memory
64x (gates), 4x (parameters / gate), 16 bits grad per param = 4096 bits.  write operations.)
64x (gates), 2x (parameters / gate), 16 bits grad per param = 2048 bits

---

Totals:
102 * 192 = 19,584 forward + backprop computations
77 * 512b memory reads
80 * 512b memory writes
-> (77+80) * 512/ 8 = 10,048 bytes of total bandwidth for combined forward and backward.
With ~4 TB/s of memory bandwidth, peak throughput may be ~7.6 TFBDLOPS

Figure 9:
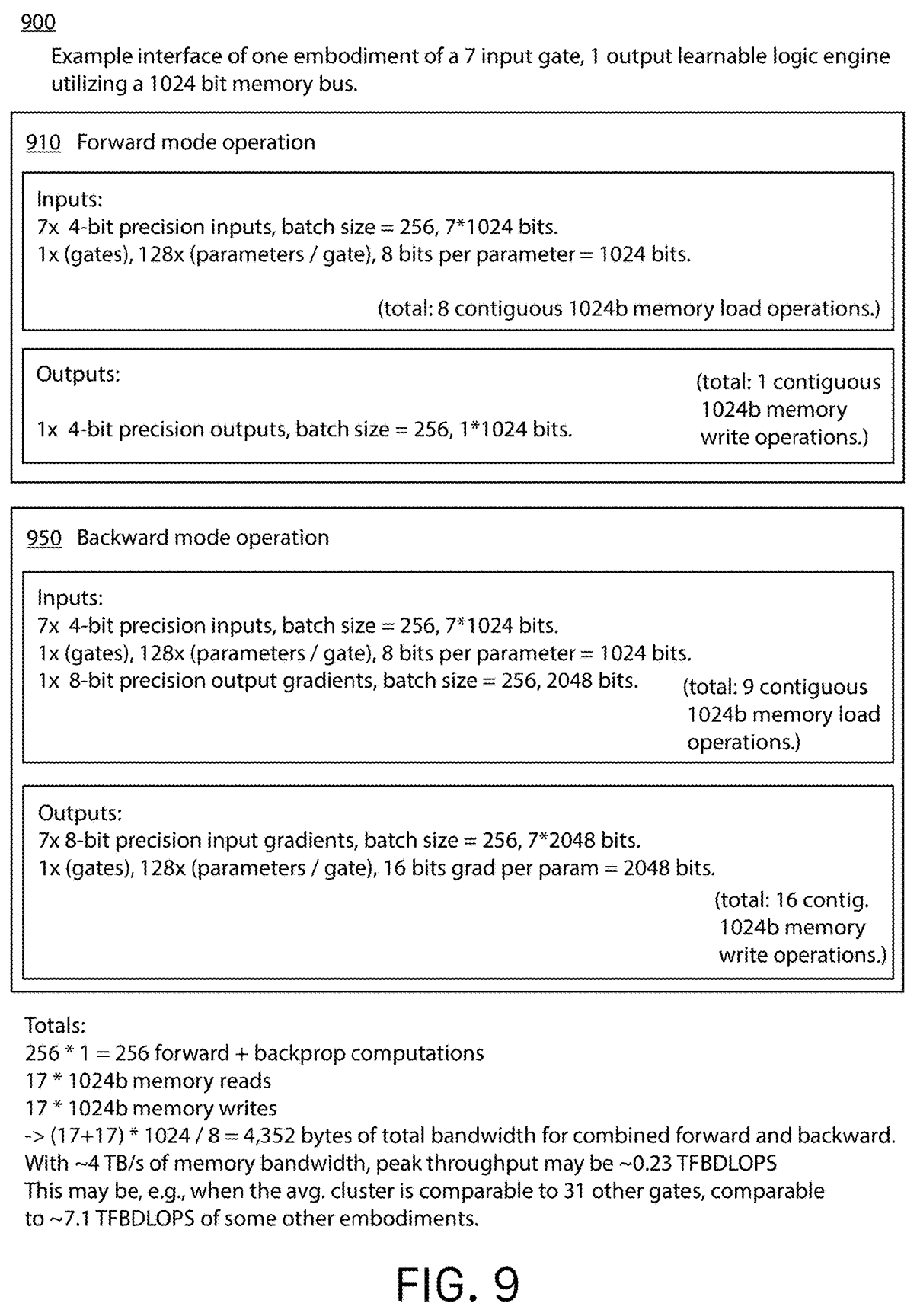

Example interface of one embodiment of a 7 input gate, 1 output learnable logic engine utilizing a 1024 bit memory bus.

---

910  Forward mode operation

Inputs:
7x  4-bit precision inputs, batch size = 256, 7*1024 bits.
1x (gates), 128x (parameters / gate), 8 bits per parameter = 1024 bits.

(total: 8 contiguous 1024b memory load operations.)

Outputs:

1x  4-bit precision outputs, batch size = 256, 1*1024 bits.

(total: 1 contiguous 1024b memory write operations.)

---

950  Backward mode operation

Inputs:
7x  4-bit precision inputs, batch size = 256, 7*1024 bits.
1x (gates), 128x (parameters / gate), 8 bits per parameter = 1024 bits.
1x  8-bit precision output gradients, batch size = 256, 2048 bits.

(total: 9 contiguous 1024b memory load operations.)

Outputs:
7x 8-bit precision input gradients, batch size = 256, 7*2048 bits.
1x (gates), 128x (parameters / gate), 16 bits grad per param = 2048 bits.

(total: 16 contig. 1024b memory write operations.)

---

Totals:
256 * 1 = 256 forward + backprop computations
17 * 1024b memory reads
17 * 1024b memory writes
-> (17+17) * 1024 / 8 = 4,352 bytes of total bandwidth for combined forward and backward.
With ~4 TB/s of memory bandwidth, peak throughput may be ~0.23 TFBDLOPS
This may be, e.g., when the avg. cluster is comparable to 31 other gates, comparable
to ~7.1 TFBDLOPS of some other embodiments.

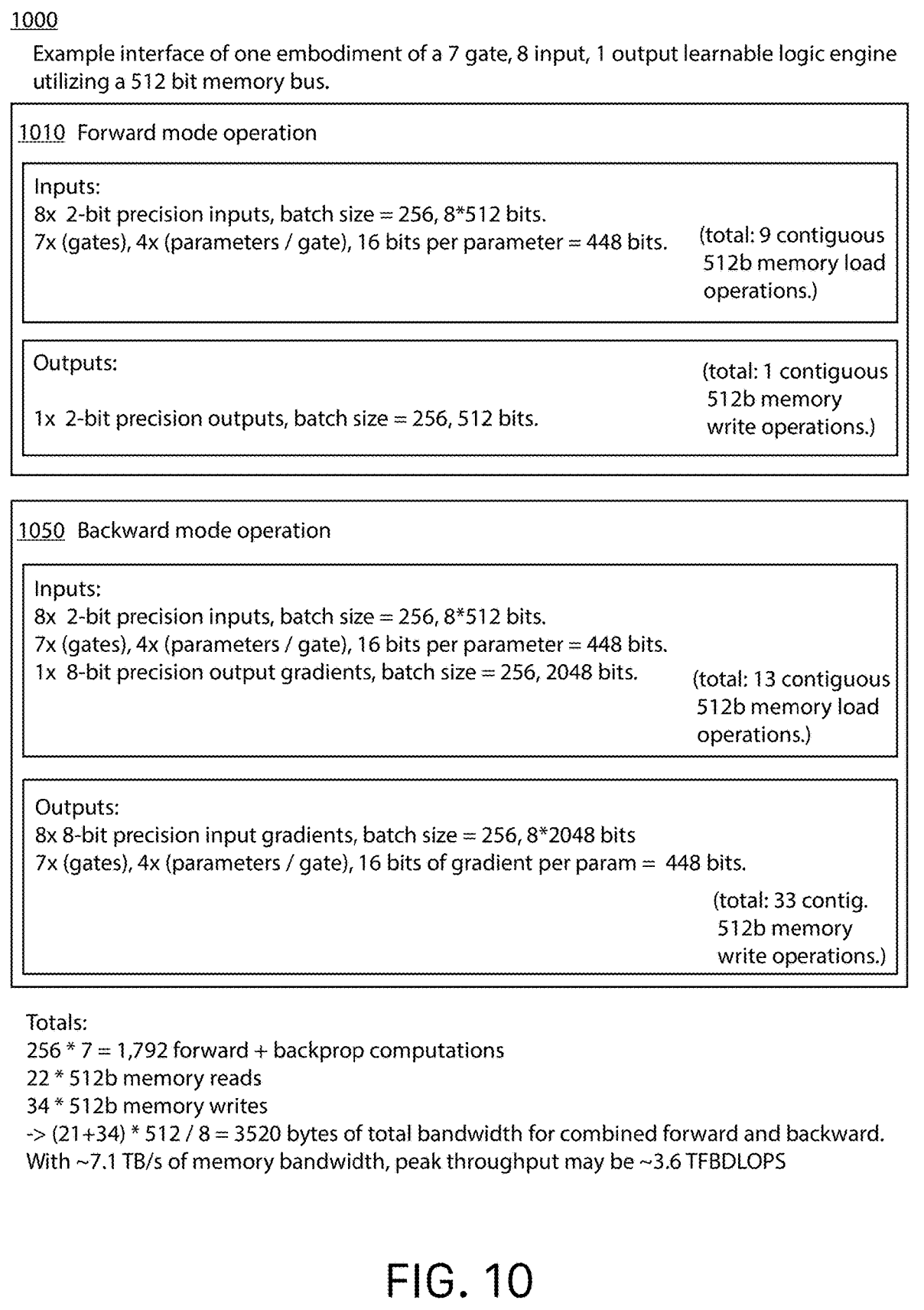

Example interface of one embodiment of a 7 gate, 8 input, 1 output learnable logic engine utilizing a 512 bit memory bus.

---

1010   Forward mode operation

Inputs:
8x 2-bit precision inputs, batch size = 256, 8*512 bits.
7x (gates), 4x (parameters / gate), 16 bits per parameter = 448 bits.    (total: 9 contiguous 512b memory load operations.)

Outputs:

1x 2-bit precision outputs, batch size = 256, 512 bits.    (total: 1 contiguous 512b memory write operations.)

---

1050   Backward mode operation

Inputs:
8x 2-bit precision inputs, batch size = 256, 8*512 bits.
7x (gates), 4x (parameters / gate), 16 bits per parameter = 448 bits.
1x 8-bit precision output gradients, batch size = 256, 2048 bits.    (total: 13 contiguous 512b memory load operations.)

Outputs:
8x 8-bit precision input gradients, batch size = 256, 8*2048 bits
7x (gates), 4x (parameters / gate), 16 bits of gradient per param = 448 bits.

(total: 33 contig. 512b memory write operations.)

---

Totals:
256 * 7 = 1,792 forward + backprop computations
22 * 512b memory reads
34 * 512b memory writes
-> (21+34) * 512 / 8 = 3520 bytes of total bandwidth for combined forward and backward.
With ~7.1 TB/s of memory bandwidth, peak throughput may be ~3.6 TFBDLOPS

FIG. 10

Example interface of one embodiment of a 300 gate, 20 input, 20 output learnable logic engine forward instruction utilizing a 1024 bit memory bus.

| Inputs:<br>20x 4-bit precision inputs, batch size = 256, 20*1024 bits.<br>300x (gates), 4x (avg. param / gate), 16 bits per parameter = 19,200 bits.<br>≤1280 cluster configuration bits. (19,200 + 1280 = 20*1024) | (total: 40 contiguous 1024b memory load operations.) |
|---|---|
| Outputs:<br><br>20x 4-bit precision outputs, batch size = 256, 20*1024 bits. | (total: 20 contiguous 1024b memory write operations.) |

Figure 12:
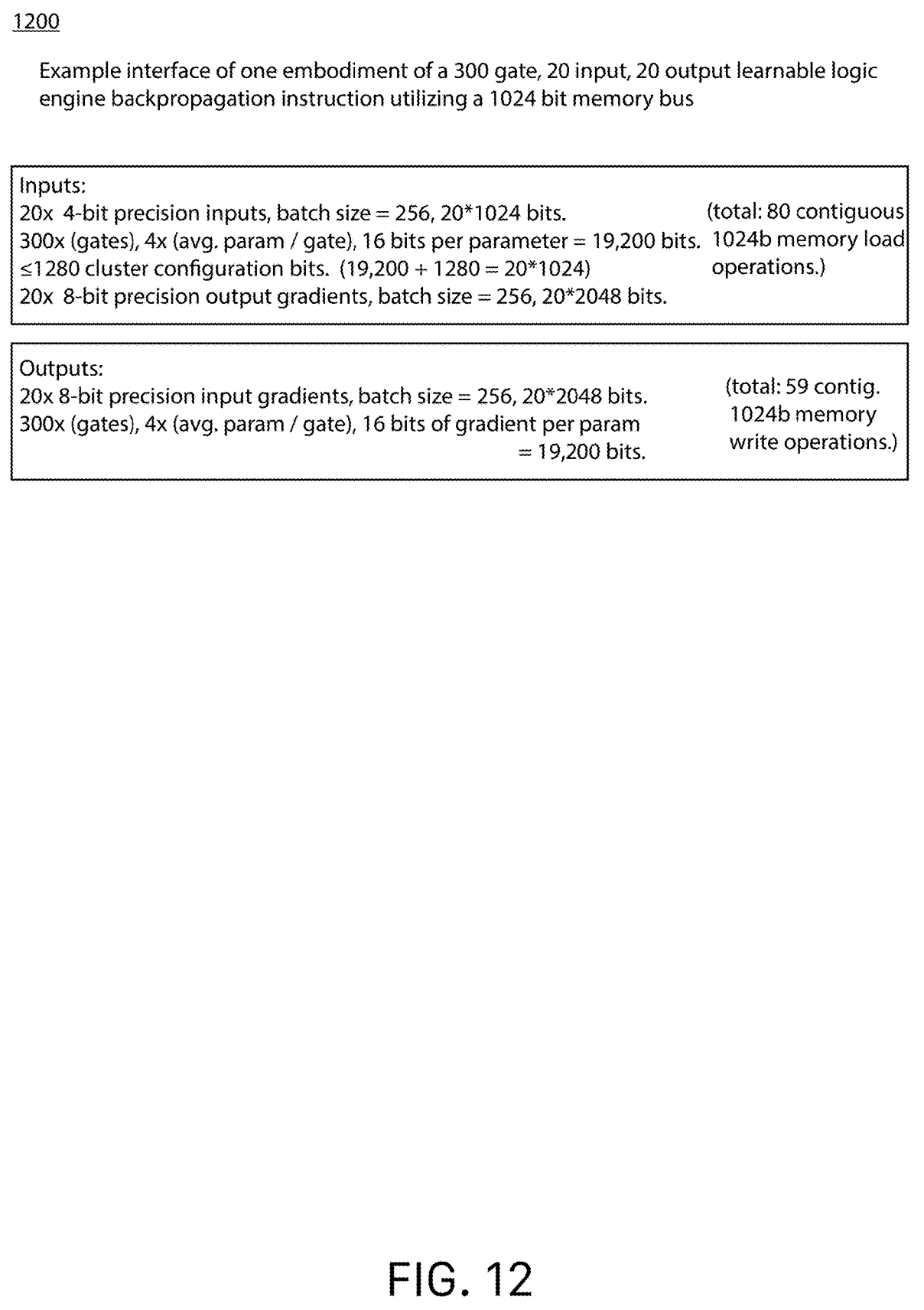

Example interface of one embodiment of a 300 gate, 20 input, 20 output learnable logic engine backpropagation instruction utilizing a 1024 bit memory bus Inputs:
20x  4-bit precision inputs, batch size = 256, 20*1024 bits.     (total: 80 contiguous
300x (gates), 4x (avg. param / gate), 16 bits per parameter = 19,200 bits.   1024b memory load
≤1280 cluster configuration bits. (19,200 + 1280 = 20*1024)     operations.)
20x  8-bit precision output gradients, batch size = 256, 20*2048 bits.

Outputs:
20x 8-bit precision input gradients, batch size = 256, 20*2048 bits.     (total: 59 contig.
300x (gates), 4x (avg. param / gate), 16 bits of gradient per param     1024b memory
= 19,200 bits.     write operations.)

Figure 13:
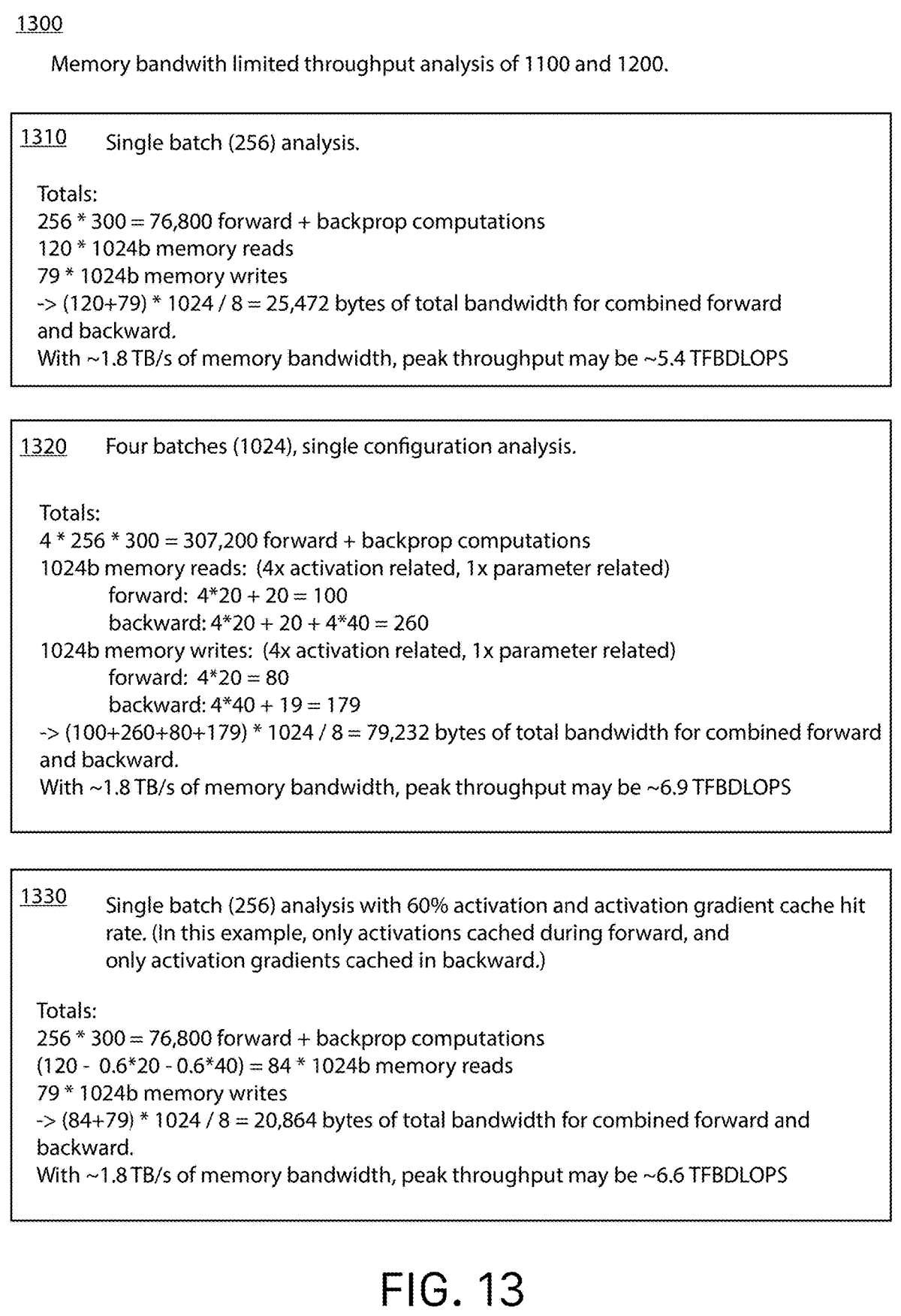

Memory bandwith limited throughput analysis of 1100 and 1200.

---

1310    Single batch (256) analysis.

Totals:
256 * 300 = 76,800 forward + backprop computations
120 * 1024b memory reads
79 * 1024b memory writes
-> (120+79) * 1024 / 8 = 25,472 bytes of total bandwidth for combined forward and backward.
With ~1.8 TB/s of memory bandwidth, peak throughput may be ~5.4 TFBDLOPS

---

1320    Four batches (1024), single configuration analysis.

Totals:
4 * 256 * 300 = 307,200 forward + backprop computations
1024b memory reads:  (4x activation related, 1x parameter related)
        forward: 4*20 + 20 = 100
        backward: 4*20 + 20 + 4*40 = 260
1024b memory writes:  (4x activation related, 1x parameter related)
        forward:  4*20 = 80
        backward: 4*40 + 19 = 179
-> (100+260+80+179) * 1024 / 8 = 79,232 bytes of total bandwidth for combined forward and backward.
With ~1.8 TB/s of memory bandwidth, peak throughput may be ~6.9 TFBDLOPS

---

1330    Single batch (256) analysis with 60% activation and activation gradient cache hit rate. (In this example, only activations cached during forward, and only activation gradients cached in backward.)

Totals:
256 * 300 = 76,800 forward + backprop computations
(120 - 0.6*20 - 0.6*40) = 84 * 1024b memory reads
79 * 1024b memory writes
-> (84+79) * 1024 / 8 = 20,864 bytes of total bandwidth for combined forward and backward.
With ~1.8 TB/s of memory bandwidth, peak throughput may be ~6.6 TFBDLOPS

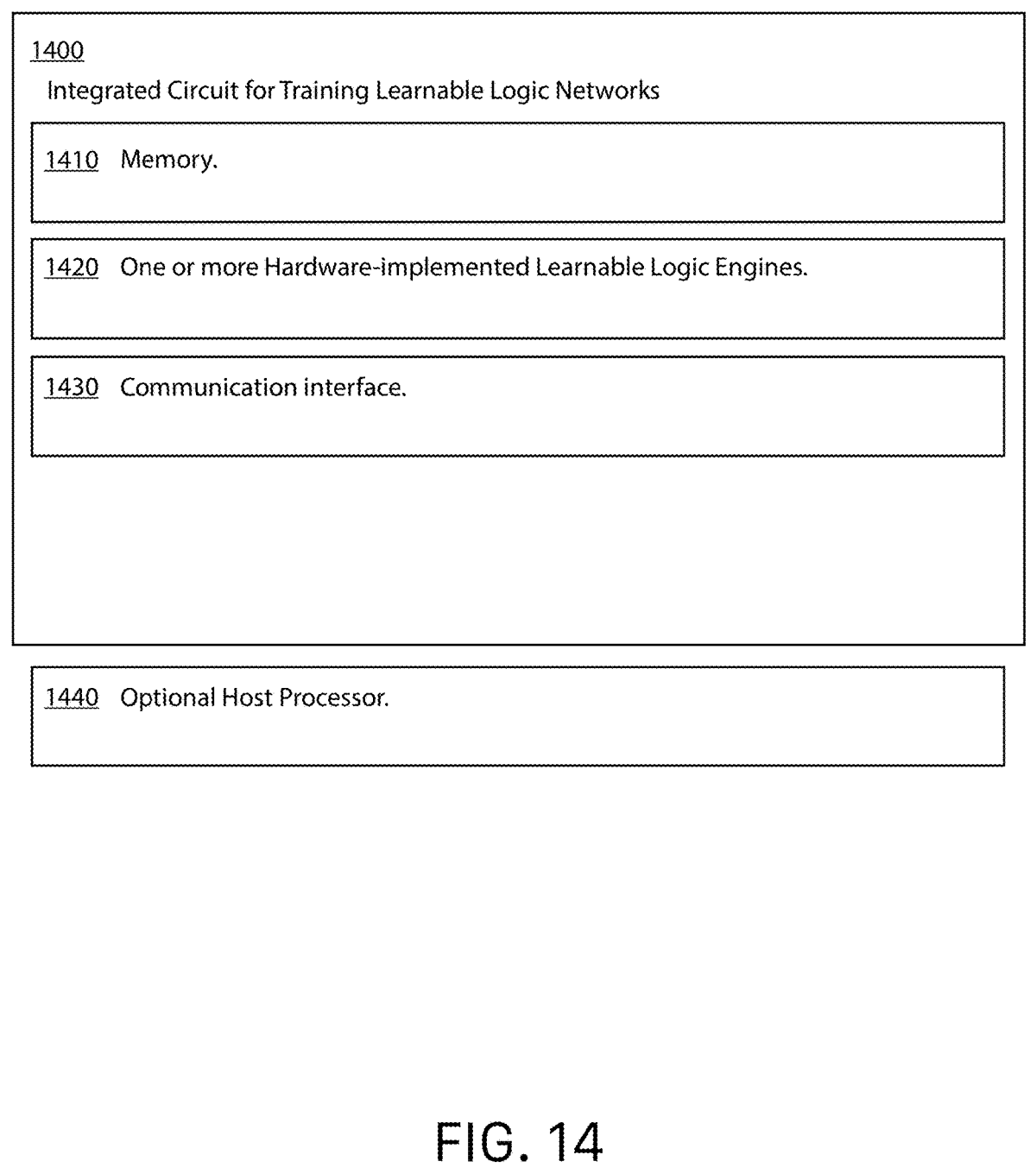

Integrated Circuit for Training Learnable Logic Networks

1410    Memory.

1420    One or more Hardware-implemented Learnable Logic Engines.

1430    Communication interface.

1440    Optional Host Processor.

FIG. 14

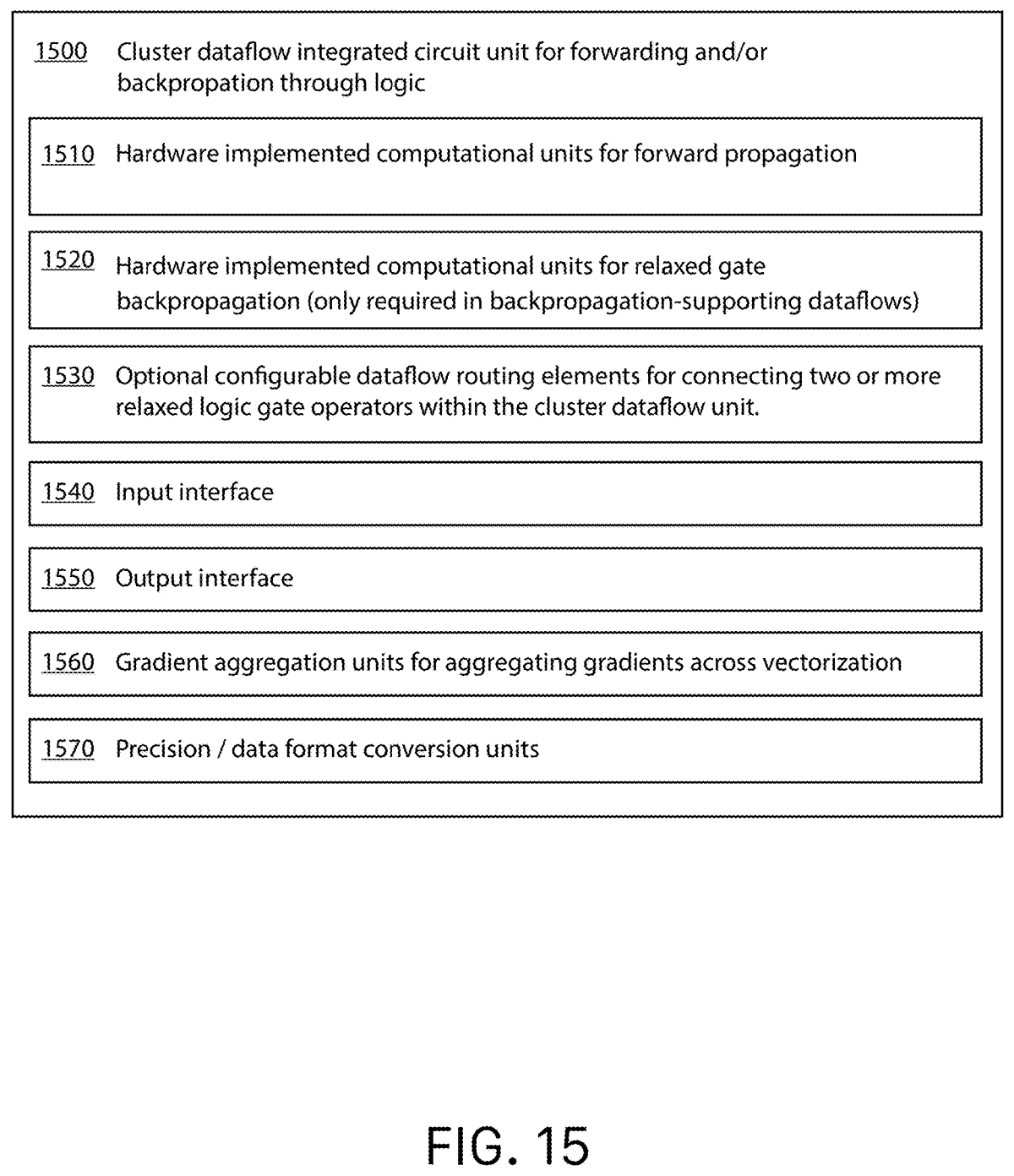

1500   Cluster dataflow integrated circuit unit for forwarding and/or backpropation through logic 1510   Hardware implemented computational units for forward propagation 1520   Hardware implemented computational units for relaxed gate backpropagation (only required in backpropagation-supporting dataflows)

1530   Optional configurable dataflow routing elements for connecting two or more relaxed logic gate operators within the cluster dataflow unit.

1540   Input interface

1550   Output interface

1560   Gradient aggregation units for aggregating gradients across vectorization 1570   Precision / data format conversion units

FIG. 15

1600   Training Apparatus for Designing Fixed Logic Gate Networks

1610   Memory

1620   Hardware-implemented Circuitry defining at least a First Instruction and a Second Instruction 1630   One or more processor cores

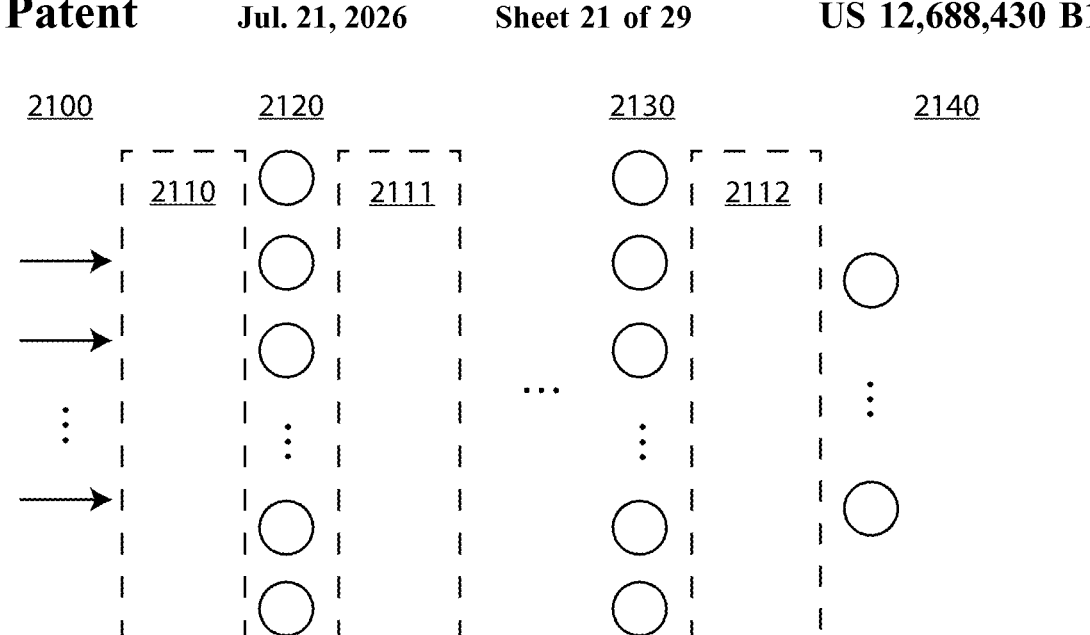
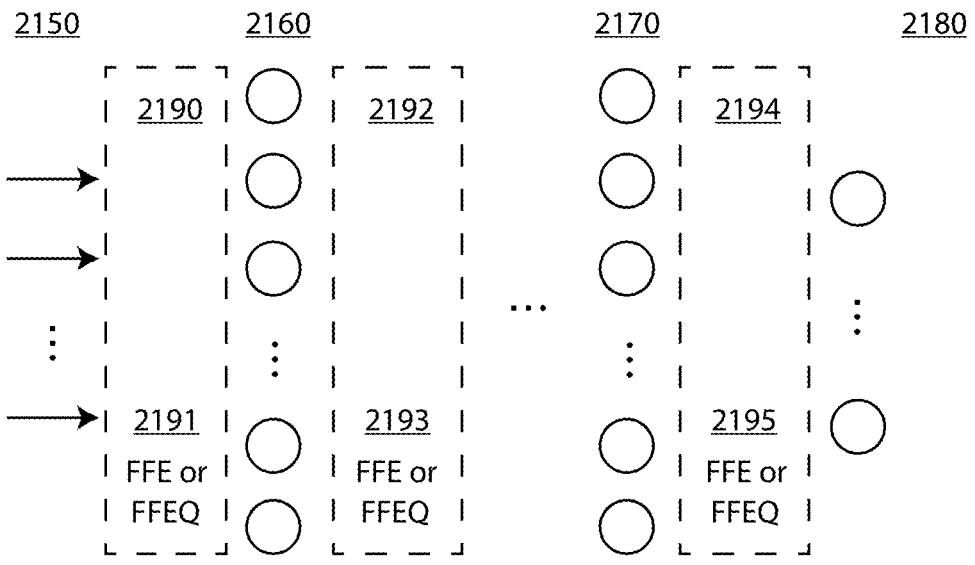
FIG. 21

2500

```
2501   // Example embodiment of a backpropagation module through 7 gates arranged
2502   // as a binary tree.
2503   // inputs:
2504   // grad_y_
2505   // a0_, a1_, a2_, a3_, a4_, a5_, a6_, a7_
2506   // states:
2507   // w[x][x]
2508   // grad_w[x]_local_x
2509   // outputs:
2510   // grad_a0_, grad_a1_, grad_a2_, grad_a3_,
2511   // grad_a4_, grad_a5_, grad_a6_, grad_a7_
2512   // submodules:
2513   // diff_logic_gate_forward
2514   // diff_logic_gate_dy_da
2515   // diff_logic_gate_dy_db
2516
2517   b0_ = diff_logic_gate_forward(w[0][0], w[0][1], w[0][2], w[0][3], a0_, a1_);
2518   b1_ = diff_logic_gate_forward(w[1][0], w[1][1], w[1][2], w[1][3], a2_, a3_);
2519   b2_ = diff_logic_gate_forward(w[2][0], w[2][1], w[2][2], w[2][3], a4_, a5_);
2520   b3_ = diff_logic_gate_forward(w[3][0], w[3][1], w[3][2], w[3][3], a6_, a7_);
2521
2522   c0_ = diff_logic_gate_forward(w[4][0], w[4][1], w[4][2], w[4][3], b0_, b1_);
2523   c1_ = diff_logic_gate_forward(w[5][0], w[5][1], w[5][2], w[5][3], b2_, b3_);
2524
2525   grad_w6_local_0 += (c0_ * c1_) * grad_y_;
2526   grad_w6_local_1 += c0_          * grad_y_;
2527   grad_w6_local_2 +=          c1_ * grad_y_;
2528   grad_w6_local_3 +=               grad_y_;
2529   grad_c0_ = diff_logic_gate_dy_da(w[6][0], w[6][1], w[6][2], w[6][3], c0_, c1_) * grad_y_;
2530   grad_c1_ = diff_logic_gate_dy_db(w[6][0], w[6][1], w[6][2], w[6][3], c0_, c1_) * grad_y_;
```

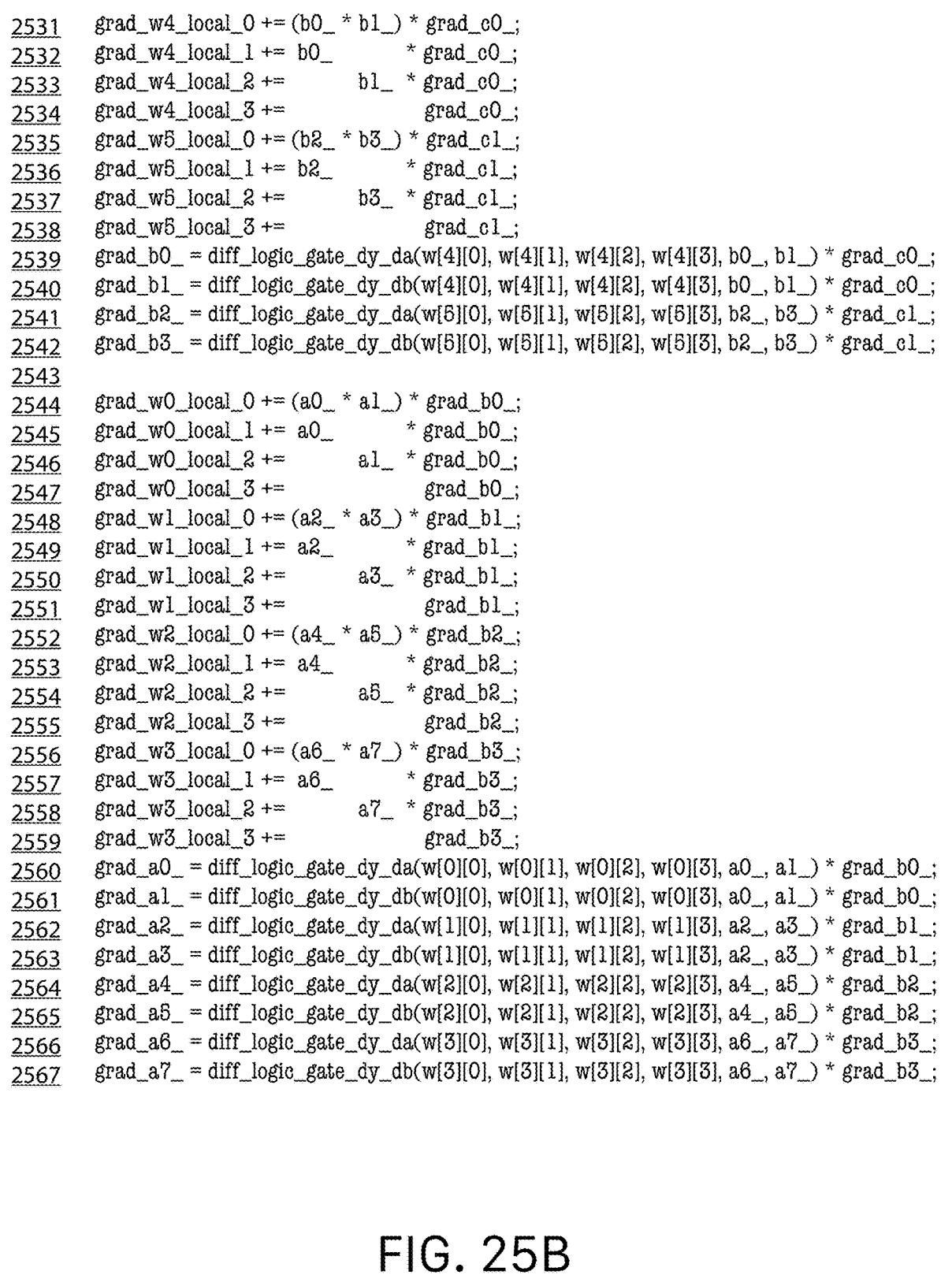

FIG. 25A 2531    grad_w4_local_0 += (b0_ * b1_) * grad_c0_;
2532    grad_w4_local_1 += b0_          * grad_c0_;
2533    grad_w4_local_2 +=          b1_ * grad_c0_;
2534    grad_w4_local_3 +=              grad_c0_;
2535    grad_w5_local_0 += (b2_ * b3_) * grad_c1_;
2536    grad_w5_local_1 += b2_          * grad_c1_;
2537    grad_w5_local_2 +=          b3_ * grad_c1_;
2538    grad_w5_local_3 +=              grad_c1_;
2539    grad_b0_ = diff_logic_gate_dy_da(w[4][0], w[4][1], w[4][2], w[4][3], b0_, b1_) * grad_c0_;
2540    grad_b1_ = diff_logic_gate_dy_db(w[4][0], w[4][1], w[4][2], w[4][3], b0_, b1_) * grad_c0_;
2541    grad_b2_ = diff_logic_gate_dy_da(w[5][0], w[5][1], w[5][2], w[5][3], b2_, b3_) * grad_c1_;
2542    grad_b3_ = diff_logic_gate_dy_db(w[5][0], w[5][1], w[5][2], w[5][3], b2_, b3_) * grad_c1_;
2543
2544    grad_w0_local_0 += (a0_ * a1_) * grad_b0_;
2545    grad_w0_local_1 += a0_          * grad_b0_;
2546    grad_w0_local_2 +=          a1_ * grad_b0_;
2547    grad_w0_local_3 +=              grad_b0_;
2548    grad_w1_local_0 += (a2_ * a3_) * grad_b1_;
2549    grad_w1_local_1 += a2_          * grad_b1_;
2550    grad_w1_local_2 +=          a3_ * grad_b1_;
2551    grad_w1_local_3 +=              grad_b1_;
2552    grad_w2_local_0 += (a4_ * a5_) * grad_b2_;
2553    grad_w2_local_1 += a4_          * grad_b2_;
2554    grad_w2_local_2 +=          a5_ * grad_b2_;
2555    grad_w2_local_3 +=              grad_b2_;
2556    grad_w3_local_0 += (a6_ * a7_) * grad_b3_;
2557    grad_w3_local_1 += a6_          * grad_b3_;
2558    grad_w3_local_2 +=          a7_ * grad_b3_;
2559    grad_w3_local_3 +=              grad_b3_;
2560    grad_a0_ = diff_logic_gate_dy_da(w[0][0], w[0][1], w[0][2], w[0][3], a0_, a1_) * grad_b0_;
2561    grad_a1_ = diff_logic_gate_dy_db(w[0][0], w[0][1], w[0][2], w[0][3], a0_, a1_) * grad_b0_;
2562    grad_a2_ = diff_logic_gate_dy_da(w[1][0], w[1][1], w[1][2], w[1][3], a2_, a3_) * grad_b1_;
2563    grad_a3_ = diff_logic_gate_dy_db(w[1][0], w[1][1], w[1][2], w[1][3], a2_, a3_) * grad_b1_;
2564    grad_a4_ = diff_logic_gate_dy_da(w[2][0], w[2][1], w[2][2], w[2][3], a4_, a5_) * grad_b2_;
2565    grad_a5_ = diff_logic_gate_dy_db(w[2][0], w[2][1], w[2][2], w[2][3], a4_, a5_) * grad_b2_;
2566    grad_a6_ = diff_logic_gate_dy_da(w[3][0], w[3][1], w[3][2], w[3][3], a6_, a7_) * grad_b3_;
2567    grad_a7_ = diff_logic_gate_dy_db(w[3][0], w[3][1], w[3][2], w[3][3], a6_, a7_) * grad_b3_;

FIG. 25B

TRAINING APPARATUS WITH INTEGRATED CIRCUITS FOR TRAINING LOGIC GATE NETWORKS

PRIORITY APPLICATIONS

This application claims priority to and benefit under 35 U.S.C. § 119 to U.S. Provisional Patent Application No. 63/927,929, titled "Training Apparatus with Integrated Circuits for Training Logic Gate Networks," filed on Nov. 30, 2025; U.S. Provisional Patent Application No. 63/772,329, titled "Extended Differentiable Logic Gate Networks," filed on Mar. 14, 2025; and U.S. Provisional Patent Application No. 63/772,339, titled "Efficiency Improvements for Training Differentiable Logic Gate Networks," filed on Mar. 14, 2025, each of which is hereby incorporated by reference in its entirety.

TECHNICAL FIELD

This disclosure relates to integrated circuits for artificial intelligence, machine learning, and neural network training.

BRIEF DESCRIPTION OF THE DRAWINGS

FIG. 1 shows an example embodiment of a training apparatus with memory for storing parameters and activations, and hardware-implemented instructions for forward and backward propagation through relaxations of logic gates.

FIG. 3 shows learnable logic engines, including a general N-input M-output engine with multiple learnable logic gate modules and a specific 8-input, 3-output example.

FIG. 6 illustrates an interface and throughput analysis of an 18-gate, 8-input, 2-output cluster learnable logic engine for forward and backward mode operations.

FIG. 7 illustrates an interface and throughput analysis of a 120-gate, 20-input, 4-output cluster learnable logic engine.

FIG. 8 illustrates an interface and throughput analysis of a 192-gate, 24-input, 4-output cluster learnable logic engine with mixed gate types.

FIG. 9 shows an interface and throughput analysis of a 7-input, 1-gate, 1-output learnable logic engine.

FIG. 10 shows an interface and throughput analysis of a 7-gate, 8-input, 1-output learnable logic engine.

FIG. 11 illustrates an interface of a 300-gate, 20-input, 20-output learnable logic engine for forward propagation only.

FIG. 12 illustrates an interface of a 300-gate, 20-input, 20-output learnable logic engine for backpropagation only.

FIG. 13 provides a memory bandwidth-limited throughput analysis of the engines in FIGS. 11 and 12 across various operational scenarios.

FIG. 14 illustrates an example block diagram of an integrated circuit for training learnable logic networks and an optional host processor, according to one embodiment.

FIG. 15 illustrates an example block diagram of a cluster dataflow integrated circuit for forward propagation and/or backpropagation through logic, according to one embodiment.

FIG. 21 shows learnable logic engines with extended functionality, including support for recurrence and flip-flop emulation.

FIGS. 25A and 25B illustrate one possible embodiment of backward-mode operation for a binary-tree arrangement of gates.

DETAILED DESCRIPTION

Figure 2:
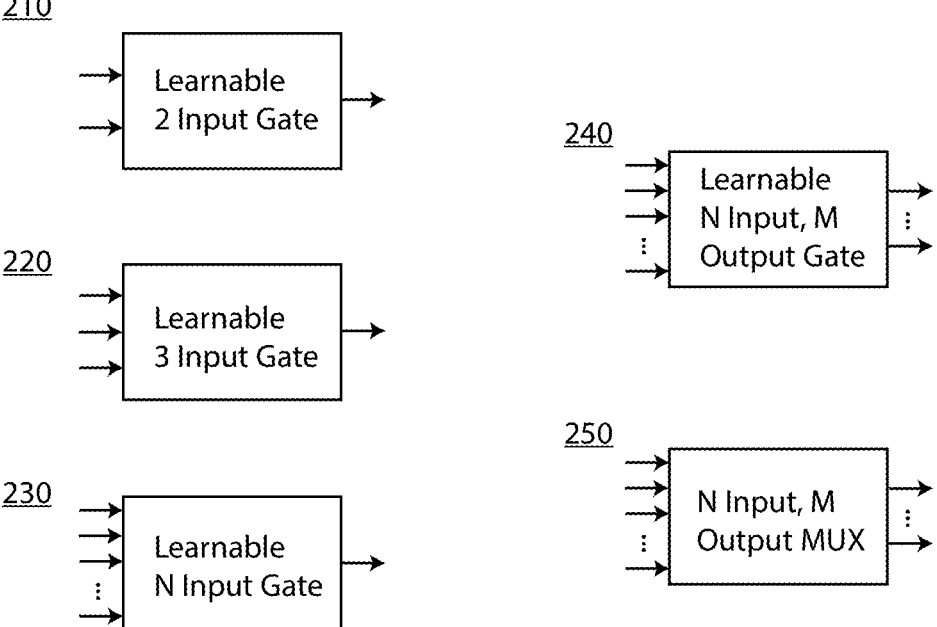
FIG. 2 illustrates examples of learnable logic gates, including two-input gates, three-input gates, N-input gates, N-input M-output gates, and an N-input M-output multiplexer module.

Modern neural network training systems predominantly rely on general-purpose compute, including CPUs and GPUs, or matrix-based accelerators, including vector-matrix instructions, matrix-based dataflow systems, and tensor cores or tensor processing units. These systems are well-suited for matrix-multiplication-based neural network training and inference.

As an alternative to matrix multiplication-based neural networks, a variety of differentiable and learnable logic-based approaches have been proposed, for example, but not limited to, "Deep Differentiable Logic Gate Networks". These learnable logic approaches optimize the selection of logic operations (including wiring and many-input logic) rather than simply optimizing the weights in a matrix multiplication. Further, they operate at a high level of sparsity. As an illustrative example, in some embodiments, there may be 10,000 gates per layer, and each gate may be only connected to two inputs from the previous layer.

While learning only a few bits of information per node, e.g., 4 bits for a general 2-input logic operation with 16 options, each node still requires fetching both inputs and the parameterization, then computing an array of mathematical operations, which is inefficient on current hardware. In some conventional examples, four floating-point values for the parameterization and two floating-point values for the inputs must be loaded from memory, the result must be written to memory, and similar computations with even more writes are executed during backpropagation. This can result in tens of instructions, register spills, and dramatic memory bandwidth requirements, and sparse memory accesses may lead to poor memory bandwidth utilization in some devices. Moreover, in many cases, the set of available mathematical instructions is not well-suited for learnable logic approaches.

Learnable logic approaches require evaluating a large number of mathematical expressions, such as, e.g., but not limited to, $$\sum_{i=0}^{15} f_i(a, b) \cdot softmax_i(z),$$

$a \cdot w_0 + (1-a) \cdot w_1$, $a \cdot w_0 + w_1$, $w_0 \cdot a \cdot b + w_1 \cdot a + w_2 \cdot b + w_3$, $w_0 \cdot a \cdot b \cdot c + w_1 \cdot a \cdot b + w_2 \cdot a \cdot c + w_3 \cdot b \cdot c + w_4 \cdot a + w_5 \cdot b + w_6 \cdot c + w_7$, wherein a, b, c may be inputs or input activations, and z, as well as w is may be parameters. Moreover, evaluating non-linear functions, as well as, in some cases, small matrix multiplications may be utilized. Restricted formulations for learning wiring-only logic gate operations may include, and may not be limited to, $a \cdot w_0 + b \cdot (1-w_0)$ or a $softmax_0(z) + b \cdot softmax_1(z) + c \cdot softmax_2(z) + d \cdot softmax_3(z) + e \cdot softmax_4(z)$. Moreover, there are expressions for arbitrary learnable N-input gates, some of which have parameterizations with $2^N$ scalar parameters per gate. Some expressions incorporate noise into the formulation. The training computations can become expensive, in part, due to sparse access to input activations and the large number of parameters loaded per gate.

Learnable logic approaches have been successfully applied in a range of settings, leading to state-of-the-art inference efficiency. But there is a major limitation to the approach. Training logic networks on existing hardware is slow because it is either designed for general-purpose computations, not suitable for large-scale training, or matrix-multiplication-based, which is not suitable for training logic networks. Accordingly, there remains a need for training hardware that facilitates efficient training of learnable logic approaches.

To address these shortcomings, the present disclosure includes systems and methods relating to application-specific integrated circuits (ASICs) that support efficient training for learnable logic approaches. For this, they may include one or more hardware-implemented learnable logic engines, which, in some embodiments, may be implemented as instructions that execute forward propagation and/or backpropagation through learnable logic.

In this disclosure, learnable logic networks, also referred to as logic-gate networks or differentiable logic networks, may be regarded as a particular class of neural networks in which the computational units implement relaxed Boolean logic operations, including their wiring, instead of weighted sums followed by conventional activation functions. Accordingly, references herein to "neural network training" encompass training of such learnable logic networks, and in some embodiments, the disclosed learnable logic engines are used as submodules within larger neural network models that combine matrix-multiplication-based layers with logic-based layers.

In some embodiments, learnable logic engines execute a cluster of two or more learnable logic operations. This can reduce the need to store the intermediate activations between learnable gates, reducing memory bandwidth consumption.

Indeed, in some embodiments, learnable logic engines provide a singular module for executing clusters of thirty or more learnable logic operations. This is supported by the insight that a cluster of locally connected learnable logic gates can not only support efficient learning but also provide the advantages of local connectivity during inference. To reduce memory bandwidth requirements and memory consumption, intermediate activations may be discarded after forward propagation and recomputed during backpropagation of training signals, such as gradients. As used herein, the term "gradient" is intended in a broad sense and is not limited to a strict mathematical definition. For example, in various embodiments and unless explicitly stated otherwise, the term "gradient" is used broadly to encompass any training signal, update direction, or other signal (including, but not limited to, gradient estimates) that is backpropagated through the network and used for optimization, whether directly corresponding to the formal mathematical notion of a gradient or not.

In some embodiments, learnable logic gate engines may be configurable. For example, one or more bits may be used to configure a learnable logic gate to define the internal topology. The configurability of learnable logic gates enables diverse ways to use learnable logic gate engines. In some embodiments, the choice of relaxation and backpropagation strategy may be configurable using one or more bits. For example, one or more non-linear functions may be selectable, an optional level of noise may be specifiable, and/or a normalization coefficient may be set.

In some embodiments, configuration bits may select a single topology from a predefined set of supported topologies. In some other embodiments, configuration bits may directly control the topology between logic gates within a learnable logic engine, subject to constraints.

In some embodiments, recurrence in networks may be supported within a learnable logic engine. For example, in some embodiments, what is otherwise described as a batch dimension may be a time dimension, facilitating communication between different elements in a recurrent format. In some other embodiments, recurrence may be supported through general mathematical instructions in the device or through specialized recurrent logic engines.

In some embodiments, convolutional application of learnable logic engines may be natively supported by the hardware. In some embodiments, the learnable logic engine may support execution of multiple convolutional layers, and may support, instead of, or in addition to, a sequential batch dimension, a spatial dimension across which convolution is applied.

In some embodiments, hardware-implemented sparse distributed memory emulation units may support efficient and effective training with sparse distributed memory units as components of the learnable logic network.

In some embodiments, learnable logic engines may execute one or more many-input logic gates with three or more inputs. For example, when executing a 7-input learnable logic gate operation, 128 scalar memory values may be required, in addition to the 7 input values. The computation of a 7-input learnable logic gate may conventionally require more than 200 floating-point instructions per input set. By implementing, e.g., a 7-input learnable logic gate operation as a learnable logic engine in the integrated circuit, one or many executions of, e.g., the 7-input logic gate operation may be performed at once, improving efficiency.

In some embodiments, the learnable logic engine may be configured to either perform a forward propagation through the learnable logics or a backpropagation through the learnable logics.

In some other embodiments, there may be dedicated learnable logic engines for forward propagation as well as for backpropagation.

In some embodiments, different learnable logic engines on the same die are assigned different roles. For example, a first subset of learnable logic engines may be dedicated to executing only forward-propagation dataflows, a second subset may be dedicated to executing only backpropagation dataflows, and a third subset may support both forward propagation and backpropagation. The relative number of engines in each subset may be selected based on workload characteristics, such as the ratio between forward and backward computations during training.

In some embodiments, the training apparatus comprises fused hardware instructions for logic gate network training, while operating in an instruction-fetch style.

In some other embodiments, the training apparatus corresponds closer to a dataflow architecture, wherein routing between hardware-defined modules for training of learnable logic is configurable, enabling execution of multiple modules without instruction fetching or with only reduced instruction fetching in some cases.

In some embodiments, a hardware module may comprise a cluster of differentiable logic gate operations fused together, wherein the module may implement both forward propagation through relaxed logic gates and gradient computation for backpropagation. This eliminates the need to re-implement those hardware components required for forward propagation to re-compute intermediate activations during backpropagation.

In some other embodiments, the instructions for forward and backward propagation computations for a specific cluster are separate engines.

In some embodiments, the learnable logic engine may process a batch of elements (batch size) with the same operations simultaneously, requiring loading the operation parameters only once while executing many learnable logic operations.

In some embodiments, the learnable logic engine may process a batch of elements (batch size) with the same operations sequentially, requiring loading the operation parameters only once while executing many learnable logic operations.

In some embodiments, the supported batch sizes may be defined based on the width of optimal contiguous memory access to improve memory bandwidth utilization.

The data types implemented on many conventional devices are not ideal for learnable logic. In some parts of learning logic, high precision may be important, while in others, only low precision is required. For example, in some cases, the activations, which may be between 0 and 1, can be of lower precision of one to eight bits, while the gradients may require higher precision of between eight and sixty-four bits. In one embodiment, there is no degradation in learning performance when reducing activation precision to seven bits, but the gradient propagation must be higher than FP16 or BF16 precision, which may both be insufficient for stable learning. In some embodiments, stable learning can be achieved with 18 bits of gradient precision, with 8 bits for the mantissa and 9 bits for the exponent. In some embodiments, stable learning can be achieved with 16 or fewer bits of gradient precision.

In some embodiments, stochastic gradient estimation may be natively supported through respective hardware implementation. In some cases, this can enable, e.g., but not limited to, using fewer bits of precision. In some embodiments, stochastic rounding or stochastic quantization can enable using fewer bits of precision while maintaining stable, accurate training. In some cases, this can be implemented directly within the learnable logic engine.

In some embodiments, the precision required for different parts of the gradient may differ. For example, the precision required for the gradient along activations may be lower than that required for the gradient of the parameterization.

In some embodiments, the suitable level of precision for different elements may depend on different configurations, including but not limited to the overall model size, the specific architecture, or the data set. Thus, in some embodiments, the precision of respective components may be configurable. For example, activation precision may, in some embodiments, be configurable to 2, 4, or 8 bits.

In still other embodiments, the forward-propagated activation values are represented using somewhat higher, but still compact, precisions. For example, the activations may be encoded using up to twelve bits of precision (e.g., 6, 8, 10, or 12 bits), while gradients and parameter values are represented with higher precisions, such as, e.g., 16 bits or more. This preserves a low memory footprint for activations while maintaining sufficient dynamic range and numerical stability for backpropagation.

In some embodiments, it is acceptable to use lower precision for communication between learnable logic engines, as long as a higher level of precision is maintained within the computations of the learnable logic engines. This may have the advantage of further reducing memory requirements, e.g., by storing and reading only low-precision activations while performing the computation efficiently in the hardware-implemented learnable logic engine at high precision.

In some embodiments, the precision of data transactions between learnable logic engines may be configurable, whereas the precision of computations within the learnable logic engines may not. This may reduce the footprint of the learnable logic engine, as it may not need to implement multiple precisions for computations. For example, in some embodiments, the learnable logic engine may support configurable vectorized utilization, e.g., for 256 bits, which may be used, e.g., via run-time configuration for processing either vectors of 64 values with 4 bits each, or vectors of 32 values with 8 bits each.

In some embodiments, a learnable logic engine has a single physical input/output interface (e.g., an X-bit bus, where X is an integer value), and different hardware-implemented instructions or dataflow definitions for interpreting the bits on the interface. For a given instruction, the numerical precision used for activations and parameters is fixed and not runtime-configurable, enabling the corresponding data to be loaded and stored in a highly vectorized manner. The same physical learnable logic engine may support multiple distinct instructions, each with different fixed precisions (for example, an instruction that uses a 6-bit activation and 11-bit parameters, and a second instruction that uses 8-bit activations and 16-bit parameters), but each individual instruction maintains a single, consistent external precision across uses. Internal computations for various instructions may be performed at equal or higher precision than the external interface precisions.

In some embodiments, the learnable logic engine may reuse floating-point operations available within or accessible to the respective core or cores, and may primarily provide additional hardware-implemented instructions to facilitate their effective and efficient utilization.

In some embodiments, the same design of a learnable logic engine may be replicated many times on the device, facilitating higher throughputs.

In some embodiments, the learnable logic engine may be implemented on an FPGA. In some embodiments, the learnable logic engine may be implemented on a dataflow accelerator.

In some embodiments, multiple learnable logic engines may be implemented on the same device to facilitate greater architectural flexibility. The learnable logic engines may have different functionalities, characteristics, and/or be configured differently.

In some embodiments, the training apparatus includes memory for storing parameters.

In some embodiments, the training apparatus includes memory for storing activations.

In some embodiments, the training apparatus includes mathematical instructions suitable for applying optimization algorithms to the parameters.

In some embodiments, the training apparatus has a communication interface for communicating with a host device and/or other training apparatuses. For example, in some embodiments, a server may contain multiple training apparatuses. In some embodiments, multiple training apparatuses may be connected in a cluster to facilitate training of large logic networks.

In some embodiments, the learnable logic engine may be a dataflow for forwarding and backpropagating through a relaxation of one or more logic gates.

In some embodiments, a distinction between a training mode and an inference mode may be made. For example, training mode may be a differentiable relaxation of the logic operations, while inference mode may correspond to hard Boolean execution of the logic operations. In some embodiments, a learnable logic engine may be configurable for training mode or inference mode. In some other embodiments, the learnable logic engine may always be in training mode, and there may, optionally, alternatively, or in addition, be a separate logic engine corresponding to it that operates only in inference mode. This separation may, in some embodiments, enable faster inference mode computations. In some embodiments, only the training mode may be available, and inference mode may be supported by a respective configuration of loaded parameters, e.g., via general-purpose compute cores.

In some embodiments, there may be differentiable logic engines without learnable parameters. For example, there may be predefined differentiable logic gate operations without learnable components, which may be implemented separately. In some other embodiments, differentiable logic gate operations without learnable parameters may be implemented within the learnable logic engine.

In some embodiments, the learnable logic engine may comprise one or more Hyper-Logic-Gates. In some embodiments, a Hyper-Logic-Gate may have learnable parameters, and in some other embodiments, the Hyper-Logic-Gate may not have learnable parameters but support backpropagation, while in still some other embodiments, some Hyper-Logic-Gates may have learnable parameters, while some other Hyper-Logic-Gates may have no learnable parameters. Support for Hyper-Logic-Gates may improve the expressivity of learned logic networks.

In some embodiments, the learnable logic engine processes multiple training samples in lockstep using the same logic gate configuration, amortizing parameter-loading costs across, e.g., 32, 64, 128, or 256 samples. The parameters for each learnable logic operation are loaded once into dedicated parameter registers, then applied repeatedly across all samples in the batch. This may reduce memory bandwidth requirements by a factor of the batch size or vectorization size compared to processing samples individually.

In some embodiments, batch processing uses SIMD (Single Instruction, Multiple Data) execution within each learnable logic engine, enabling the same logic gate relaxation computation to execute across multiple data streams. For example, in some embodiments, for a batch size of 128, this may be implemented as 128 parallel data paths sharing the same control logic and parameter storage. In some other embodiments, the elements may be streamed one after another for the same instruction.

In some embodiments, what is otherwise described as a batch, may also correspond to a vectorized representation of elements rather than a true batch as would be understood by some machine learning practitioners (some practitioners may use batch to refer to a true batch dimension, while others may refer to the dimension across which the same operation or set of operations may be applied.)

In some embodiments, the parameters may reside in respective learnable logic engines throughout training, and all uses of the learnable logic engines may be unrolled across a number of devices. This may enable higher training speeds but may utilize a large number of devices.

In some embodiments, the training apparatus includes dedicated gradient accumulation buffers co-located with each learnable logic engine. These buffers accumulate gradients across multiple micro-batches before writing back to main memory, reducing memory write bandwidth by 10×-100×. In some embodiments, each buffer may be 4 KB to 1 MB of SRAM positioned adjacent to the compute units.

In some embodiments, the gradient buffers implement atomic addition operations to support concurrent gradient updates from multiple learnable logic engines operating on different parts of the same network layer. This eliminates synchronization overhead in distributed training across multiple engines on the same chip.

In some embodiments, the training apparatus maintains shadow copies of parameters at different precisions: full-precision for master weights, reduced-precision for forward propagation, and intermediate-precision for gradient computation. The engine may automatically manage precision conversion between these representations.

In some embodiments, the training apparatus implements loss scaling hardware that automatically adjusts gradient scaling factors to prevent underflow in low-precision gradient representations. The scaling factor may be dynamically adjusted based on gradient statistics collected over a sliding window of 100-100,000 iterations. In some embodiments, information about the gradient magnitude or other meta information may be provided as meta information, e.g., for vectorized activation gradients. For example, the precision of gradients processed by a learnable logic engine may be reduced when additional magnitude information is provided, e.g., the gradient may have fewer exponent bits while an additional exponent offset is provided as meta information. This may reduce the memory bandwidth requirements. For example, in some learnable logic engines, the largest gradients may matter most, and their magnitudes may vary significantly across a large logic network, i.e., between uses of learnable logic engines.

In some embodiments, the learnable logic engine or a separate module of the circuit may natively support hard forward propagation through discretized learnable logic operators, e.g., but not limited to, for quantifying a discretization error, for partial hardening, for second forward hardening, for approximate synthesis, or for evaluating current discretized model performance.

In some embodiments, the backward data path implements optimized circuits for the chain rule computations specific to learnable logic gates.

In some embodiments, the learnable logic engine includes dedicated circuits for recomputing activations during backpropagation. Rather than storing all intermediate activations (requiring terabytes of memory for large networks), the engine may store only checkpoint activations and may recompute intermediate values on demand during the backward pass.

In some embodiments, the training apparatus includes specialized coprocessors for executing parameter updates according to various optimization algorithms (e.g., SGD, Adam, RMSprop, AdamW, Nadam, Radam, Adamax, ASGD, LBFGS, Muon, etc.). These coprocessors may implement, e.g., but not limited to: Momentum accumulation with configurable decay rates (0.9, 0.99, 0.999), Adaptive learning rate computation with numerical stability guards, Weight decay, and optional gradient clipping in hardware.

In some embodiments, a parameter update coprocessor may operate asynchronously from the main training pipeline, processing accumulated gradients while the next forward-backward pass executes.

In some embodiments, the learnable logic engine includes hardware random number generators for introducing controlled noise during training. The noise may be added to, e.g., and not limited to, (i) logic gate selections (Gumbelsoftmax relaxation), (ii) activation values (dropout, noise regularization), and/or (iii) gradient or update computations (gradient noise for exploration).

In some embodiments, the random number generators may implement high-quality PRNGs or true random number generators based on thermal noise or quantum effects. In some other embodiments, the random number generators may implement low-quality random number generators, e.g., when the precise characteristics of the random noise may not be crucial. In some embodiments, random noise within a learnable logic engine may be generated from a seed, enabling recomputation of intermediate results during backpropagation or ensuring deterministic behavior across training.

In some embodiments, dynamic learnable logic fusion may be utilized to dynamically select a topology of learnable logic engines to train a specified logic gate network with a topology that was not previously manually mapped to a topology of learnable logic engine executions. For example, in some embodiments, a user may specify a network topology of learnable logic gates that, then through a dynamic learnable logic fusion may be mapped onto a topology of respective clusters of learnable logic gate operators, which is trainable via a training apparatus with a set of clusters and potentially restricted topologies supported by the learnable logic engines.

In some embodiments, optical communication interfaces may facilitate faster, higher-bandwidth communication between multiple training apparatuses.

In some embodiments, throughput may be measured in TFBDLOPS (Tera-Forward-and-Backward-Differentiable-Logic-Operations per Second), counting the throughput of combined forward and backward operations through differentiable logic operations per second.

In some embodiments, 1 TFBDLOPS may correspond to 6 TFLOPS for matrix-multiplication-based network training, since 6 FLOPs are required per parameter: 2 FLOPs for the forward and 4 FLOPs for the backward.

In some embodiments, the training apparatus may support evolutionary or greedy optimization of logic operations. In some embodiments, the cost of a resulting logic gate network may be taken into account during training, with regularizations that favor parameters that yield less expensive networks.

In some embodiments, the learnable logic engine may be implemented for learning ternary logic gate operators. This may support improved expressivity through three-state activations, and in some other embodiments may utilize the third state to indicate, e.g., "don't cares" making inference more efficient. In some embodiments, this may also be favorable when implementing the trained inference logic gate network using a manufacturing process natively supporting ternary logic. In some embodiments, ternary activations may be expressed for training, including but not limited to, using complex-valued activations, using two parameters, e.g., in the context of a softmax transform into probabilities corresponding to respective values, or using three parameters representing tendencies towards respective states. In some embodiments, the activations may be encoded via two axes, e.g., one scalar for indicating between True and False, and one scalar indicating between a concrete value and an "unknown" state. In some embodiments, the learnable logic engine may implement other many-valued learnable logic, e.g., but not limited to four-valued logic, nine-valued logic, or other finite-valued logic.

In certain deployments, the training apparatus is used to design fixed logic gate networks that will later be implemented as largely non-reconfigurable inference hardware. During training, the learnable logic engines optimize parameterizations and, in some embodiments, discrete logic-gate selections and wiring patterns, optionally, subject to cost metrics such as gate count, latency, area, or estimated power consumption. In some embodiments, after training converges, updated parameterizations and/or discrete logic configurations are exported from the apparatus, for example, as configuration bitstreams, lookup-table contents, or standard-cell netlists, or respective raw learned parameters for off-device conversion into previously mentioned formats, which can then be realized as fixed logic gate networks in ASICs, FPGAs, or other inference devices.

In some embodiments, the learnable logic engine may support random sampling of input connections or connection configurations based on sampling. For example, but not limited to, stochastic gradient estimation may be used to sample connections, enabling sparse input selections that reduce memory bandwidth while supporting additional learnable connectivity. In some embodiments, this may be natively supported by the circuitry of a learnable logic engine, while in other embodiments, this may be performed, e.g., in more general-purpose cores or fabric.

In some embodiments, a large number of relaxed logic gate operations may be supported in a learnable logic engine, while the number of input activations and output activations may be limited to reduce memory communication requirements. For example, in the embodiment of FIG. 8, 192 gates are implemented, with only up to 24 inputs and only up to 4 outputs. In some embodiments, multiple types of relaxed logic gates are supported within one learnable logic engine. For example, in one embodiment shown in FIG. 8, the learnable logic engine may include 64 3-input gates, 64 2-input gates, and 64 1-input gates. In another embodiment of FIG. 8, the learnable logic engine may have 64 3-input gates, 64 2-input gates, and 64 4-input gates, wherein the 4-input gates are defined to support only feed-forwarding of their respective inputs, enabling them to be parameterized with only 2 parameters.

In some embodiments, there is a hardware-defined maximum number of inputs and outputs for a learnable logic engine, but either the number of inputs, the number of outputs, or both is configurable. For example, a particular learnable logic engine may have up to 16 inputs and up to 2 outputs, with up to 64 two-input gates. Depending on the connections between the logic gate operators, only a subset of inputs and outputs may be used. For example, it may be set to use only 8 inputs and generate only 1 output, which, in some embodiments, may reduce the required memory bandwidth, since, with respect to activations, only 8+1=9 memory transactions may be required instead of 16+2=18.

In some embodiments, providing sufficient flexibility of the optional configurable wiring between the learnable logic gate operator modules in the learnable logic engine, the learnable logic engine may be used, e.g., as a single 8-input gate, as a cluster of 64 2-input gates, or as a cluster of 32 3-input gates.

In some embodiments, clusters of multiple gates may be arranged in a variety of ways, e.g., but not limited to, in multiple layers of equal or similar number of gates, or in a K-ary tree for K-input gates. For example, 40 3-input gates may be arranged, e.g., but not limited to, as four layers of 10 gates each, or as a ternary tree of depth 4, e.g., with 27, 9, 3, and 1 gates in respective levels of the tree structure.

In various embodiments, example cluster sizes include, without limitation, clusters of 7, 15, 18, 32, 64, 120, 192, or more relaxed logic gate operators, with the particular size chosen based on area, bandwidth, and application constraints. In some embodiments, the number of bits used to represent the parameterization of a cluster of relaxed logic gate operators scales substantially linearly with the number C of gates in the cluster. In some embodiments, the number of bits used to represent the parameterization of a gate of relaxed logic scales substantially exponentially with the number N of inputs to the gate, supporting learning of the full space of N-input gates. In some embodiments, the number of bits used to represent the parameterization of a gate of relaxed logic supporting only wiring options scales substantially logarithmically or substantially linearly with the number N of inputs to the gate, supporting learning of gate selections corresponding, e.g., to the N options of wiring options. In various embodiments, the scaling of number of parameters or number of parameter bits depends on the choice of relaxation.

In some embodiments, the arrangement between the gates within the learnable logic engine may not be configurable.

In some embodiments, the number of gates in the cluster of gates in the learnable logic engine may be dynamic, e.g., but not limited to, the engine may support executing up to 8 gates in parallel per cycle, and operate on instructions while retrieving learnable gate parameterizations as well as temporarily stored activations for within the cluster, from localized memory that may be part of the learnable logic engine, or directly connected memory.

In some embodiments of learnable 2-input gates, the forward propagation through the relaxation may comprise circuitry computing $c \cdot a \cdot b + d \cdot a + e \cdot b + f$. In some embodiments, non-linear functions, e.g., sigmoidal functions or sigmoidal functions with an affine transform, may be computed within the learnable logic engine, which may be implemented in circuitry. In some other embodiments, the learnable logic engine does not comprise circuitry for computing non-linear functions, e.g., but not limited to, when a non-linear function computation may be performed in a more general-purpose part of the training apparatus. The latter embodiment may have the advantage of being more flexible in selecting non-linear functions. The former embodiment may offer greater efficiency at the expense of more chip area for the learnable logic engine in some embodiments. In some embodiments, the former embodiment may also be required, when non-linear functions may be required within the learnable logic engine and may not be equivalently performed outside the learnable logic engine.

In some embodiments, the learnable logic engine may alternatively be defined with respect to activations ranging, e.g., from −1 to 1 instead of from 0 to 1, or with other ranges, and may further, after training, be mapped to fixed logic with values of 0 and 1.

In some embodiments, the bottleneck of the training apparatus may lie in the memory bandwidth. Thus, in some embodiments, the training apparatus may have a memory bandwidth exceeding 1 TB/s, in some other embodiments, exceeding 4 TB/s.

In some embodiments, the learnable logic engine may support only a single learnable logic gate. For example, in one embodiment, it may load two input activation sets of 32 bits each, corresponding to vectorized batches of 8 values, each of 4 bits of precision, representing values between 0 and 1. Further, it may load one vectorized parameter set of 32 bits, corresponding to 4 parameters of 8 bits of precision each, each of which may represent a different range of values corresponding to respective parameterizations. The forward output may be a single vectorized activation set of 8 output activations, each with 4 bits of precision, representing values between 0 and 1.

In another example embodiment, it may load two input activation sets of 32 bits each, corresponding to vectorized batches of 4 values, each of 8 bits of precision, representing values between 0 and 1. Further, it may load one vectorized parameter set of 32 bits, corresponding to 4 parameters of 8 bits of precision each, each of which may represent a different range of values corresponding to respective parameterizations. The output of the forward may be one vectorized activation set of 4 output activations, each of 8 bits of precision, representing values between 0 and 1. Various other combinations are possible.

In some embodiments, during backpropagation, the input activation gradient may be represented using 8-bit values, e.g., one bit for the sign, one bit for the mantissa, and six bits for the exponent. This can, in some embodiments, enable, for example, vectorized activation gradients, with a 32-bit data type representing four activation gradients, each of 8 bits. This may be combined, in some embodiments, with parameter gradients of 16-bit precision. In various embodiments, gradients may require higher precision than forward propagation activations. In some cases, while activations may range from 0 to 1, gradients may require a higher dynamic range, e.g., from $-10^{\wedge}8$ to $+10^{\wedge}8$, while also providing high precision for small gradients such as $10^{\wedge}-8$. In various embodiments, the precision of activation gradients may be lower than that of parameter gradients. For example, with a batch size of 128, there may be 128 activation gradients, which may be combined into a parameter gradient; it may be important to maintain a higher level of precision in the aggregated parameter gradient than in each of the 128 activation gradients.

In some embodiments, the backpropagation may be performed in an atomicAdd style, wherein input activation gradients (which may be one of the outputs of the back-propagation) are aggregated using atomicAdd instructions. In some other embodiments, backpropagation with respect to an input may be performed within a single learnable logic engine by traversing all learnable gates with a given shared input and accumulating input activation gradients there.

In various embodiments, the integrated circuit includes vectorized low or custom-precision atomicAdd operations. Specifically, these may be designed to correspond to the data type of the gradient of activations. This can provide the advantage of efficiently accumulating all gradients with respect to a given activation, which can then be used as input to multiple upstream learnable gates.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order or even sequentially, nor do the steps need to be executed only once unless otherwise specified.

FIG. 1 shows an example embodiment of the training apparatus 100, with a memory for storing parameters and activations 110 of the learnable logic. In various embodiments, this may be high-bandwidth memory, or memory with a bandwidth exceeding 400 GB/s, preferably exceeding 1.6 TB/s, and even exceeding 8 TB/s. While memory bandwidth may be a limiting factor in some embodiments, in other embodiments, it may be preferable to use slower memory, with the advantage of reducing per-device cost and supporting a larger number of devices within a given budget. The training apparatus 100, moreover, comprises one or more hardware-implemented instructions or dataflows for forwarding and backpropagating through a relaxation of one or more logic gates 120, which may be embodied through one or more learnable logic engines. For example, there may be one learnable logic engine providing one instruction for forward propagation through a selectable number of gates, with up to, e.g., but not limited to, 512 learnable 2-input gates, with up to 32 input activations, and with up to 16 output activations. Moreover, in various embodiments, the instruction may be vectorized across a batch or other dimension.

The training apparatus 100 may further comprise arithmetic instructions suitable for optimization algorithms applied to the parameters 130, such as, but not limited to, SGD, Adam, RMSprop, AdaGrad, AdaDelta, Adamax, Nadam, AdamW, RAdam, LAMBs, NovoGrad, AdaBound, AMSGrad, AdaFactor, Lookahead, Ranger, ISAAC, MADGRAD, Lion, Sophia, Shampoo, and Muon. These arithmetic instructions may, in some embodiments, also be used for flexible choices of additional operations not supported by the learnable logic engine, or when combining non-learnable logic components with learnable logic components. Moreover, the training apparatus 100 may contain a communication interface 140. This may, in some embodiments, be used for communication with a host device or for communication between training apparatuses. For example, but not limited to, the communication interface may, in some embodiments, be a PCIe interface.

FIG. 2 illustrates four examples of learnable logic gates (210, 220, 230, 240), and one example of a fixed but relaxed logic gate unit (250). Presented is a learnable logic gate with two inputs and one output 210. In various embodiments, the learnable gate 210 is parameterized with four parameters. Four parameters may be sufficient in some embodiments since $2^4=16$ combinations can span the space of all 16 possible logic gate operators. In some other embodiments, it may be parameterized with 16 parameters, e.g., using a softmax function. In some other embodiments, with a softmax function, only four parameters may be used. It may be mentioned that, in certain embodiments, the parameters in the learnable logic gate module may be in a different format than those stored in memory, and that they may be translated during reading from global memory, or may be stored in multiple formats in the global memory. For example, in some embodiments, a first set of parameters may be optimized, while a functionally dependent second set of parameters may be present in the learnable logic engine. For example, these may, in some embodiments, be related by a sigmoidal function.

Further, in some embodiments, they may be related, alternatively or in addition, via a matrix multiplication that translates between a first set of parameters in the optimization space and a second set of parameters used, e.g., as coefficients in the learnable logic gate module. While 4 parameters may be more efficient, in some relaxations, there are certain equivalences between 4 and 16 parameters for a learnable two-input logic gate. In some embodiments, a particular relaxation may be used, which may be more computationally intensive but exhibit better training dynamics. In some embodiments, the gate may be parameterized, e.g., by a single parameter. For example, the options for the learnable gate, with inputs a and b may be limited to the choices "wire a" and "wire b." This may be more parameter-efficient, while still exhibiting the capability of learning which of two inputs to receive, which may be helpful for a downstream learnable logic gate. The discussions above on the example of the 2-input gate may analogously apply to other gates, e.g., 220, 230, and 240.

Further, FIG. 2 shows a learnable 3-input logic gate with a single output 220. This may be parameterized in various embodiments using 8 parameters. Module 230 illustrates a learnable N-input logic gate. In various embodiments, the learnable N input logic gate 230 may be parameterized via $2^N$ parameters. Learning an N-input gate may comprise optimizing between $2^{2^N}$ possible configurations of the logic gate. In some other embodiments, learning of an N-input logic gate may be parameterized, e.g., via N or log N parameters, e.g., when restricting the options to wires. In some embodiments of this, it may be preferable to utilize N parameters due to improved training dynamics, e.g., in conjunction with softmax, stochastic variants of softmax, top-k sampling, or stochastic gradients estimators of arg-max.

In some embodiments, the learnable N input logic gate 230 may be comprised of two learnable N−1 input logic gates in conjunction with an input-controlled multiplexer, which may, e.g., be a probabilistic multiplexer or other relaxed multiplexer. In some embodiments of this, an N-input learnable logic gate may have a number of configuration bits configuring its modes of operation.

The learnable N input and M output logic gate 240 extends the learnable N input logic gate 230 by having M outputs rather than just a single output. In various embodiments, this may be parameterized via $M \cdot 2^N$ parameters, and may have functional equivalences to M independent learnable N input 1 output logic gate. In some embodiments, the circuitry comprising a learnable N input and M output logic gate may be reused in a secondary mode with the same number of parameters as a learnable N–1 input and 2·M output logic gate.

In some other embodiments, a learnable logic gate may be parameterized via a smaller number of parameters. For example, low-rank approximations can reduce the number of parameters. Reducing the number of parameters can reduce memory bandwidth requirements per operation, improve training dynamics in some cases, and reduce the amount of local memory, which may be implemented in expensive SRAM. In some embodiments, each of the learnable logic gate modules 210, 220, 230, and 240 may be learnable logic engines. For example, the N input logic gate module may be, by itself, a learnable logic engine, or in combination with others, as discussed elsewhere, comprise a learnable logic engine.

The fifth illustrated relaxed gate in FIG. 2 is an N input M output multiplexer (MUX in the figure) module 250. In various embodiments, this gate does not contain learnable parameters. Nevertheless, it may be relaxed to support both forward and backpropagation. In various embodiments, N may be $N=M \cdot H + 2^H$ for some integer $H \geq 1$. In some embodiments, two N-input logic gates combined with a 3-input multiplexer may comprise the functional equivalent of an N+1 input logic gate. In some embodiments, an N-input M-output multiplexer may have learnable parameters. For example, a multiplexer may have H·M learnable parameters, and $2^H$ inputs, learning which input to forward for each output. In some other embodiments, a multiplexer with learnable parameters may have $M \cdot 2^H$ parameters, while having H inputs, learning which parameter to return for an input combination.

In various embodiments, the modules in FIG. 2 are relaxed with probabilistic relaxations and may utilize polynomial computation arithmetic units. In various other embodiments, other relaxations are utilized, e.g., but not limited to, probabilistic, Hamacher t-norm, relativistic Einstein sum t-conorm, Godel t-norm, maximum t-conorm, Lukasiewicz t-norm and t-conorm. In some embodiments, the choice of relaxation is configurable with configuration bits. Various embodiments utilize $a \cdot w_0 + w_1$ or $w_0 \cdot a \cdot b + w_1 \cdot a + w_2 \cdot b + w_3$, some of which may optimize wis indirectly by optimizing a parameterization that wis may be derived from, e.g., using non-linear computations, which may be performed outside the learnable logic module or outside the learnable logic engine in some embodiments.

FIG. 3 shows two learnable logic engines 310 and 320. Learnable logic engine 310 has 8 inputs 311 and 3 outputs 313 with a cluster of logic gates 312 within. Learnable logic engine 320 has N inputs 321 and M outputs 323, and two or more learnable logic gate modules 322 within. The inputs comprise N "wires" 321 along which activations, which may be real-valued, while represented using limited precision, are propagated into a cluster of S learnable logic gate modules 322. In various embodiments, the cluster of logic gates enables configuration of the topology within the cluster of learnable logic gate modules. In some embodiments, there is no fixed number of learnable logic gate modules. In various embodiments, support is provided for up to a maximum number of learnable logic gate nodes, e.g., 1024, which may be defined by the amount of local storage available.

For example, during each cycle, propagation through, e.g., 16 parallel learnable logic gate nodes may be supported through 16 physically implemented learnable logic gate nodes, with up to, e.g., 64 cycles of propagation to be supported to implement the up to, e.g., 1024 logic gate nodes, which may be provisioned for the cluster through the local memory. A learnable 8-input, 3-output cluster of learnable logic gate nodes 310 is illustrated as an example embodiment of the more general form 320.

Figure 4:
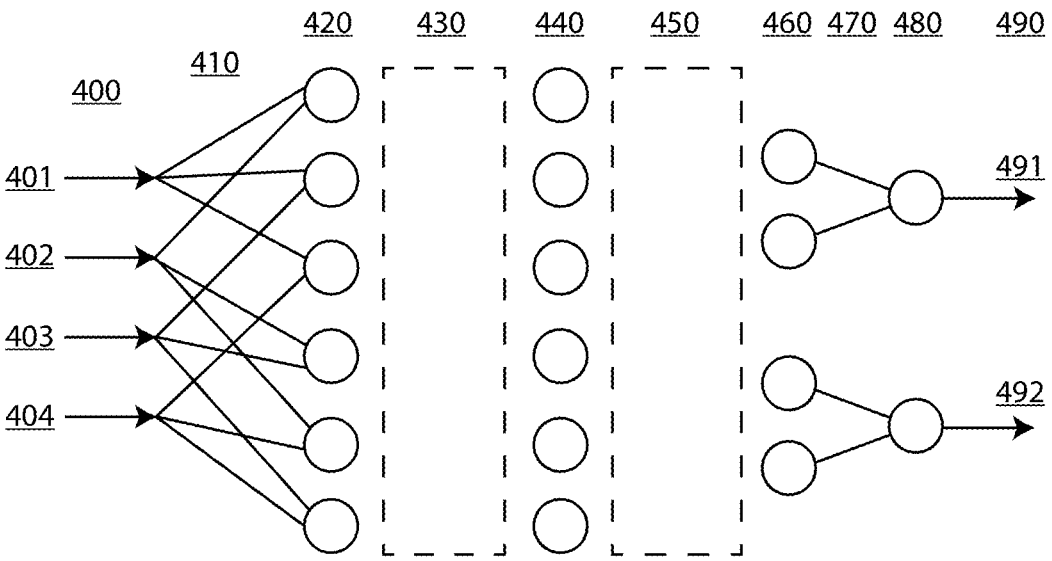
FIG. 4 shows an embodiment of internal topology within a cluster of learnable logic gate modules comprising a learnable logic engine with multiple interconnect layers.

FIG. 4 shows one embodiment of internal topology within the cluster of learnable logic gate modules comprising a learnable logic engine. At 400, four inputs (401, 402, 403, 404) are provided. These may be connected through a predefined topology 410 to the first layer of learnable logic modules 420. In the illustrated embodiment, learnable logic modules 420 with two inputs each are used, and a fixed topology with all possible combinations of two inputs is employed; there are 6 learnable logic modules 420. Various alternative embodiments are possible, e.g., but not limited to, varying the number of learnable logic modules or changing the connection patterns. The outputs of the 6 learnable logic modules 420 are connected to 6 learnable logic modules 440 through an interconnect 430. The interconnect 430 may be fixed and static, or reconfigurable but hard (not learnable), configured through a number of configuration bits that select from a small set of available configurations, or more flexible, covering all possible configurations. In some embodiments, the interconnect 430 is relaxed and learnable, e.g., via a softmax relaxation of connection combinations.

This may be advantageous in certain embodiments by providing greater flexibility in what can be learned, but on the other hand, it can be more expensive to implement in the circuitry of the learnable logic engine and may require significant additional memory overhead. In some embodiments, additional non-learnable (but still relaxed) logic modules may be included in the learnable logic engine. In some of those embodiments, logical ANDs may be relaxed with a minimum operation, and logical ORs may be relaxed with a maximum operation. This can provide computational advantages, since the circuitry may only have to provision a selection of the minimum/maximum, which may be stored in a single bit, and backpropagate more easily as well.

A second interconnect 450 may be included to increase the depth and further the flexibility of the learnable logic engine. Discussions apply as for interconnect 430; however, in certain embodiments, different configurations between 430 and 450 may be utilized. For example, the system may use full flexibility in the interconnect 430 configurability while using the limited configurability of the interconnect 450. This may be more cost-effective and sufficient since there may be invariances that may make certain interconnection configurations between 440 and 460 obsolete. Two layers of learnable logic 460 and 480 are provided, and may be connected through a fixed topology, e.g., as two tree structures 470, to then lead to two outputs 490 (491, 492).

Figure 5:
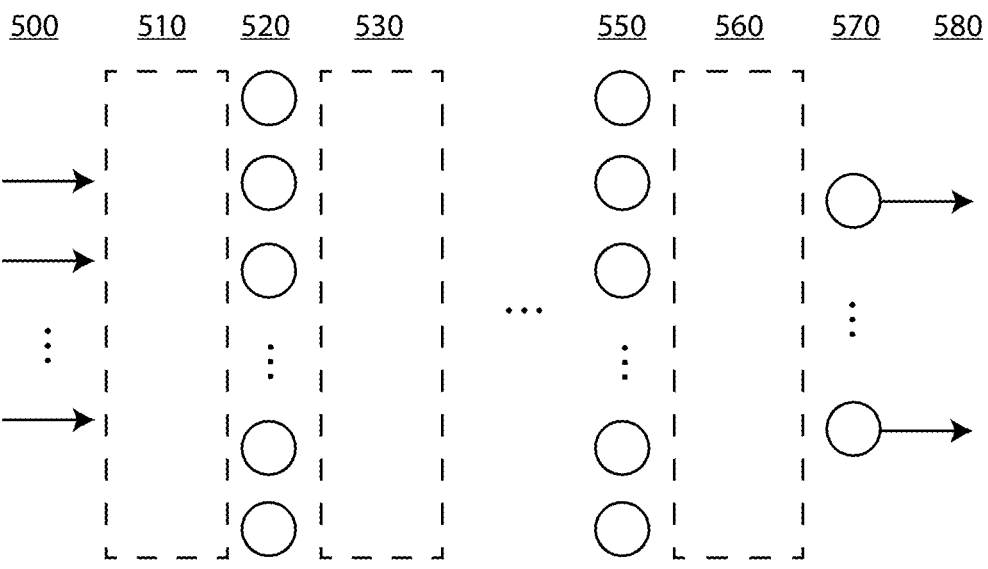
FIG. 5 shows a learnable logic engine with flexible interconnect patterns between learnable logic gate modules, including configurable interconnects.

FIG. 5 shows a learnable logic engine with a more flexible interconnect pattern between the learnable logic gate modules. Input layer 500 comprises N inputs (where $N \geq 2$). Interconnects that are optionally run-time configurable are provided in 510, 530, and 560. Each intermediate layer (520, 550) may provide a number of learnable logic modules. In certain embodiments, the number of learnable logic modules may differ. In various embodiments, different numbers of inputs to the learnable logic modules may be used. At 570, a number of outputs, e.g., M may be embodied through a number of M learnable logic modules. Outputs of the learnable logic engine may be provided at 580.

FIG. 6 illustrates the interface of an example embodiment of a learnable logic engine, including memory bandwidth-limitation-based throughput analysis. The interface 600 of one embodiment of an 18-gate, 8-input, 2-output cluster learnable logic engine may be implemented using a number of instructions, e.g., two instructions (one forward-mode instruction and one backward-mode/backpropagation instruction), or embedded in a dataflow. An example of the implications of a 512-bit memory bus is presented. During forward mode operation 610, a set of inputs is provided. These inputs may comprise 8×6-bit precision inputs, which may be fully utilized by the bus and accepted for a batch size of 85, and accordingly be packed into 8×510 bits, enabling contiguous memory accesses. Moreover, a number of parameters may be loaded from memory, e.g., for 18 learnable logic modules, each with two inputs and parameterized by four parameters, using 14 bits of precision for each parameter.

In various embodiments, these parameters in the learnable logic engine may not be the parameters of the optimization space, but may instead be non-linearly transformed from the parameters in the parameterization space. For example, in some embodiments, the parameters loaded into the learnable logic engine may be coefficients $w_i$ for computations, such as, but not limited to, $w_0 \cdot a \cdot b + w_1 \cdot a + w_2 \cdot b + w_3$. The number of those parameters may be 72; accordingly, using 1008 bits, which may be loaded through two contiguous memory load operations. Additionally, 16 cluster configuration bits are provided, for example, to configure the topology and select additional features.

After performing the computations, two outputs, at 8-bit precision, may be returned. This may be done, e.g., for a batch or vectorized size of 85, using two 510-bit writes. Using a batch size of 85 may be advantageous for maintaining contiguity, while as close as possible to utilizing the bus. Internal conversion to higher precision within the learnable logic engine incurs minimal cost, especially when the selection of interface precision options is limited or restricted to a single option, such as 6 bits in the example. For contrast, when implementing comparable learnable logic on GPUs in software, it may be more expensive to use non-natively supported precisions such as 6 bits, whereas by designing and manufacturing a specialized training apparatus, the optimal precisions for learnable logic may be natively implemented.

In some embodiments, while in forward mode operation for the same set of parameters, any subsequent uses of the learnable logic engine may only require supplying the 8×6-bit precision inputs, while the parameterization itself may be locally stored within the learnable logic engine for application to additional inputs. The interface of the backward mode operation 650 (backward mode means backpropagation in this context) again comprises a number of inputs and outputs.

In some embodiments, the learnable logic engine may have been used with a different set of parameters since the previous forward propagation. Accordingly, the parameters and configuration bits may typically need to be reloaded for backward mode operation. Accordingly, for the backward mode, the parameters, inputs, and configuration bits may be provided as inputs to the learnable logic engine. Moreover, in some embodiments, the learnable engine may have a parameter gradient accumulator that accumulates gradients over the batch (e.g., 85 elements) or across multiple uses of the same parameters with different input values, if the parameter store is not vacated between input sets and instead maintained for multiple inputs.

Additionally, as an additional input for backward mode operation, the output gradients may be provided. For example, the output gradient provided as an input (during backpropagation, gradients with respect to the output are typically an input to the backpropagation) may be 2 (since two outputs) output gradients with each 18-bit precision, thereby comprising 2×1530 bits, or 6 contiguous loads on the example memory bus. In various embodiments, the gradient precision may be higher than the forward-propagated activation precision, since the gradient range may be larger than the activation range, which is limited to 0 to 1. It is to be noted that throughout this disclosure, there may be multiple memory buses, and that they are provided as examples for optimizing contiguous memory accesses. In various embodiments, depending on the system, contiguous memory accesses may not be required, or different patterns may be better. A discussion of memory bus and contiguity is included to illustrate the compatibility of learnable logic engines with the contiguity requirements of certain systems and platforms. In various other embodiments, input activations and activation gradients may not be vectorized or only partially vectorized and instead be streamed while still using loaded parameterizations for multiple sets of activations.

The output of the backward mode operation may be one input gradient batch for each batch of inputs. For example, it may be 8×18-bit precision input gradients, provided with a batch size of 85, comprising 8×1530 bits of gradient information. Moreover, before vacating the parameterization, the accumulated parameter gradient may be returned, for example, for 18 gates each with 4 parameters and 21 bits of gradient per parameter, thus comprising 1512 bits of information. In some embodiments, the gradient update may alternatively be applied directly in the learnable logic engine. In various embodiments, the precision of parameter gradients may be higher than that of activation gradients because parameter gradients typically accumulate a larger number of activation gradients. For example, some noise in the activation gradient may have a smaller effect on the parameter gradient, since it accumulates across a batch.

In some embodiments, learnable logic engines may include instructions following a different specification, e.g., "parameter+configuration setter" and "parameter-gradient getter" instructions, and may then be applied to smaller vectorized batches of inputs or to individual inputs. In some embodiments, multiple cores may communicate directly with a single learnable logic engine, wherein each core, via its interface with the learnable logic engine, sends its respective inputs to the learnable logic engine. It may be preferable to operate the device with a sufficient number of inputs to be propagated through a learnable logic engine, so that the memory transactions for the parameters do not become a bottleneck. Nevertheless, in some embodiments, this mode may still be supported to provide greater flexibility.

FIG. 6 further illustrates an analysis 600 of memory-limited throughputs. Provided by the example are 85 times 18, i.e., 1530 forward and backpropagation computations. Herein, 26 memory reads of 512 bits may be utilized, and 29 memory writes of 512 bits may be utilized. This may correspond to (26+29)*512/8=3520 bytes of total bandwidth for combined forward and backward. In an example with ~3.6 TB/s of memory bandwidth, the peak throughput may be ~1.5 TFBDLOPS (Tera-Forward-and-Backward-Differentiable-Logic-OPerations per Second). For comparison, efficient implementations on GPUs with comparable memory bandwidth can typically attain peak throughputs of between 0.1 TFBDLOPS and 0.3 TFBDLOPS, showing that hardware-implemented learnable logic engines provide improved performance.

In some embodiments, a learnable logic engine may support a range of different interfaces. For example, in some embodiments, it may support operating either one cluster of 72 gates or two clusters simultaneously, each consisting of 36 gates. It may also support using four clusters of 18 gates each. It may also be configurable to support, e.g., using only one cluster of 36 gates, while the other 36 gates remain unused.

FIG. 7 illustrates an example interface 700 of one embodiment of a 120-gate, 20-input, 4-output cluster implemented as a learnable logic engine. In this example, for the sake of throughput analysis and vectorized batch-size selection, a 2048-bit memory bus is assumed; however, this is readily replaceable. In forward mode operation 710, the interface differs from forward mode operation 610 (in FIG. 6) by using different precisions, batch sizes, and numbers of inputs, gates, outputs, and configuration bits. In backward mode operation (backpropagation) 750, the interface differs from backward mode operation 650 (in FIG. 6) in using different precisions, batch sizes, and numbers of inputs, gates, outputs, and configuration bits.

In comparison to the example in FIG. 6, the example embodiment in FIG. 7 uses a larger number of vectorized inputs as well as supports learning a larger number of gates. Specifically, 256*120=30,720 forward+backprop computations may be performed, requiring 58*2048b memory reads and 70*2048b memory writes. For a bandwidth-limited throughput analysis, (58+70)*2048/8=32,768 bytes of total bandwidth for combined forward and backward may be required. Accordingly, with ~3.3 TB/s of memory bandwidth, the peak throughput may be ~3.1 TFBDLOPS. This is an illustrative example of embodiments, where providing a larger number of learnable gates in the learnable logic engine may be advantageous, providing higher peak throughput, even with a slightly reduced memory bandwidth, compared to FIG. 6.

FIG. 8 illustrates an example interface and throughput analysis 800 of one embodiment of a 192-gate, 24-input, 4-output cluster learnable logic engine. Compared to the previous two examples 600 and 700, herein, different types of learnable gates with different numbers of parameters are mixed. For example, the 192 learnable gates may comprise 64 gates with 8 parameters per gate, 64 gates with 4 parameters per gate, and 64 gates with 2 parameters per gate. In this example, there may be no configuration bits. The learnable logic engine may have gates arranged with a fixed topology, e.g., 64 learnable 3-input gates and 64 learnable 2-input gates, corresponding to those with 8 and 4 parameters, respectively. The gates with 2 parameters may be 4-input gates, but are limited to a restricted set of possible options of logic gate operators, restricted to only a, b, c, d.

Accordingly, by effect, only wires may be learned in these gates. This can be implemented, e.g., by implementing (for parameters $w_0$, $w_i$) $a \cdot w_0 \cdot w_1 + b \cdot w_0 \cdot (1-w_i) + c \cdot (1-w_0) \cdot w_1 + d \cdot (1-w_0) \cdot (1-w_i)$ in the hardware circuit. Alternative formulations are possible. In accordance, there may be an equal distribution of 2-input, 3-input, and 4-input gates, wherein, to reduce parameterization, the 4-input gates are limited to wire choices. This enables greater flexibility in connections, which can be learned rather than set by hard (non-differentiable) configuration bits. The throughput analysis, based on forward mode operation 810 and backward mode operation 850, is similar to those of 600 and 700, and illustrated in 800. One of the differences is that multiple gate types with different numbers of parameters per gate need to be considered here. With ~4 TB/s of memory bandwidth, the peak throughput may be ~7.6 TFBDLOPS, surpassing the peak throughput of previous examples.

FIG. 9 shows an example interface and throughput analysis 900 of one embodiment of a 7-input, 1-gate, 1-output learnable logic engine. This may differ from 600, 700, or 800 by providing only a single learnable gate module. In the example, the gate may have 128 parameters, thereby spanning the space of all possible 7-input logic gates.

In some embodiments, similar interfaces like 900 may be provided, but with different number of inputs to the learnable gate, e.g., but not limited to, 2 inputs with 4 parameters, 3 inputs with 8 parameters, 4 inputs with 16 parameters, 5 inputs with 32 parameters, 6 inputs with 64 parameters, 8 inputs with 256 parameters, or 9 inputs with 512 parameters. In certain embodiments, the number of inputs may be increased to increase the flexibility of learning, but they may not all be used for a single large gate, even when the learnable logic engine primarily comprises a singular large gate. For example, in some embodiments, there may be 12 inputs, and the engine may have a 6-input learnable gate with 64 parameters. Using a 12-input gate with 4096 parameters may be prohibitive in certain situations, so the system may use additional 6 2-input gates that may aggregate the input into 6 intermediate activations going into a 6-input learnable gate. These may be, e.g., each with 1 parameter to enable distinction between two wire choices, or 4 parameters to support the full learnable space of 2-input gates, or, in some cases, 3 parameters to reduce redundancy with the downstream gate.

The performance analysis of the forward mode operation interface 910 and the backward mode operation interface 950 indicates that, with ~4 TB/s of memory bandwidth, the peak throughput is ~0.23 TFBDLOPS. At first glance, the impression may arise that this is hardly better than a GPU software implementation, but it should be noted that a 7-input gate provides significantly higher expressivity than a 2-input gate. In a more direct comparison, depending on runtime training characteristics that depend on architecture, hyperparameters, data modality, and data set, the 7-input gates may convert into, e.g., ~31 2-input gates on average, leading to performance comparable to ~7.1 TFBDLOPS of some other embodiments.

In some embodiments, it is possible to reduce the number of parameters loaded into the learnable logic engine in some learnable gates connected to some downstream learnable gates. For example, a coefficient corresponding to a constant addition may, in some cases, be omitted via incorporation into the parameterizations of the downstream parameters. Whether to include this feature depends on the device's performance characteristics, in some cases leading to additional efficiency and in others to additional overhead.

FIG. 10 shows an example interface and throughput analysis 1000 of one embodiment of a 7-gate, 8-input, 1-output learnable logic engine. Two instructions or modes are provided, one for forward mode operation 1010, and one for backward mode operation 1050. Again, the precision differs from previous examples, illustrating that the exact choice of precision depends on a variety of factors and that a large number of embodiments is possible. One example configuration of the topology between the gates is 7 2-input gates arranged in a binary tree of depth 3, with 4 gates in the first layer, 2 in the second, and 1 in the third. The memory bandwidth-limited throughput analysis provides that with ~7.1 TB/s of memory bandwidth, the peak throughput may be ~3.6 TFBDLOPS. This may be lower than previous embodiments, but may provide greater flexibility in architectural design, since the fixed hardware-implemented learnable logic engine may be a smaller unit.

FIGS. 25A and 25B illustrate one possible embodiment 2500 of the backward mode operation 1050 as a pseudocode describing one embodiment of the hardware-implemented flow with code lines 2501-2530 and 2531-2567, respectively. In FIG. 25A, 7 gates are arranged as a binary tree. The input to the backpropagation may be the output gradient ("grad_y_", at 2504) as well as the inputs ("a0_, a1_, a2_, a3_, a4_, a5_, a6_, a7_", at 2505). Internal states of the learnable logic engine may be "w[x][x]" (2507), the parameters within the learnable logic engine, and "grad_w [x]_local_x" (2508), the gradient accumulators. The back-propagation computes the input gradients ("grad_a0_, grad_a1_, grad_a2_, grad_a3_, grad_a4_, grad_a5_, grad_a6_, grad_a7_" in the FIG. 2510, 2511), as well as update the gradient accumulators, which may be returned, e.g., after finishing a vectorized processing, or after finishing a batch, or after finishing multiple vectorized processings with different inputs and the same parameters. The submodules may comprise "diff_logic_gate_forward" 2513, "diff_logic_gate_dy_da" 2514, "diff_logic_gate_dy_db" 2515, which may depend, e.g., on the choice of the relaxation. A first circuit implements forward propagation through the first 6 gates (the first 2 layers).

This circuitry may be shared between forward and backward modes of the learnable logic engine. Then, the parameter gradient accumulators may be calculated/updated according to the relaxation, e.g., using "grad_w6_local_0+=(c0_*c1_)*grad_y_;" 2525 etc. The presentation, while presenting pseudo-code for the hardware implementation, is selected to prevent overwhelming the practitioner with a figure containing too many boxes and instead presents a concrete example of information flow through the hardware. Various other embodiments use alternative relaxations, and some of those accordingly use other backward formulations.

FIG. 11 illustrates an example interface 1100 of a 300-gate, 20-input, 20-output learnable logic engine, utilizing a 1024-bit memory bus, according to one embodiment. The inputs may comprise 20×4-bit-precision inputs, with a batch size of 256, corresponding to 20*1024 bits; 300× gates, with an average number of parameters per gate of 4 and 16 bits per parameter, thus corresponding to 19,200 bits. This may be padded by <1280 cluster configuration bits, leading to 19,200+1280=20*1024 bits of parameterization and configuration information to be loaded. The outputs of the learnable logic engine, which may be a forward-propagation-only learnable logic engine, may be 20 4-bit precision outputs, with a batch size of 256, corresponding to 20*1024 bits.

FIG. 12 illustrates an example interface 1200 of a 300-gate, 20-input, 20-output learnable logic engine, utilizing a 1024-bit memory bus, according to one embodiment. In this embodiment, the learnable logic engine may support only backpropagation. The inputs may comprise 20×4-bit-precision inputs, with a batch size of 256, corresponding to 20*1024 bits; 300× gates, with an average number of parameters per gate of 4 and 16 bits per parameter, thus corresponding to 19,200 bits. This may be padded by 1280 cluster configuration bits, leading to 19,200+1280=20*1024 bits of parameterization and configuration information to be loaded. Additionally, 20×8-bit-precision output gradients with batch size=256 may be provided, corresponding to 20*2048 bits. The backpropagation operation may return 20×8-bit-precision input gradients with a batch size of 256, totaling 20*2048 bits. Moreover, it may accumulate parameter gradients, e.g., for 300 gates with 4 parameters per gate on average and 16 bits of gradient per parameter, leading to 19,200 bits.

FIG. 13 provides a memory bandwidth-limited throughput analysis 1300 of FIG. 11 and FIG. 12 with multiple cases. In the single-batch (256) analysis 1310, there are 256*300=76,800 forward+backprop computations, requiring 120*1024b memory reads and 79*1024b memory writes. This may lead to (120+79)*1024/8=25,472 bytes of total bandwidth for combined forward and backward traffic. In one example, with ~1.8 TB/s of memory bandwidth, the peak throughput may be ~5.4 TFBDLOPS. In the four-batch (4*256=1024) single-configuration analysis, 1320, there are 4*256*300=307,200 forward+backprop computations. Moreover, there may be 4*20+20=100 1024b memory reads in the forward propagation, as well as 4*20+20+4*40=260 1024b memory reads for the backpropagation. There may be 4*20=80 1024b memory writes during forward propagation and 4*40+19=179 1024b memory writes during backpropagation. This may result in (100+260+80+179)*1024/8=79, 232 bytes of total bandwidth for combined forward and backward traffic.

In one example, this may lead to a peak throughput of ~6.9 TFBDLOPS with ~1.8 TB/s of memory bandwidth. It may be noted that the throughput may be higher than before in this case, which can be attributed to reduced memory bandwidth requirements enabled by the ability to store parameterization information across multiple batches. In 1330, a single batch (256) analysis with 60% activation and an average activation gradient cache hit rate follows, according to one embodiment. In this example, only activations are cached during forward, and only activation gradients are cached in backpropagation. There may be 256*300=76,800 forward+backprop computations, requiring (120−0.6*20−0.6*40)=84*1024b memory reads and 79*1024b memory writes. Accordingly, there may be (84+79)*1024/8=20,864 bytes of total bandwidth for combined forward and backward traffic. With ~1.8 TB/s of memory bandwidth, peak throughput may be ~6.6 TFBDLOPS. It may be noted that cache may be utilized in some embodiments, while some other, more dataflow-oriented training apparatuses may not require cache or may utilize a different type of cache.

In some embodiments, the backward mode operation instruction of the learnable logic engine may be split into multiple instructions. For example, in some embodiments, the computation of the input gradient and the parameter gradient may be split into two parts. This can, e.g., enable aggregation of input gradients across multiple locations where a given input activation is used, while still maintaining parameter-level gradient accumulation.

FIG. 14 illustrates an example block diagram of an integrated circuit 1400 for training learnable logic networks and an optional host processor 1440, according to one embodiment. As illustrated, the integrated circuit 1400 may include a memory 1410, one or more hardware-implemented learnable logic engines 1420, and a communication interface 1430. In some embodiments, the integrated circuit 1400 may be part of a system that further includes a host processor 1440.

In various embodiments, the memory 1410 may be configured to store activation values and parameter values of a learnable logic network. In various embodiments, one or more of the hardware-implemented learnable logic engines 1420 may be configured to process a plurality N of input activations, where N is an integer greater than or equal to two, and generate M output activations, where M is an integer greater than or equal to one, through S learnable logic gate operations, where S is an integer greater than or equal to one, as described in detail herein. In various embodiments, one or more of the hardware-implemented learnable logic engines 1420 may be configured to process a plurality N of input activations and M output activation gradients, where N is an integer greater than or equal to two and M is an integer greater than or equal to one, through S learnable logic gate operations, where S is an integer greater than or equal to one, generating one or more of input activation gradients and parameter gradients (which may be accumulated), as described in detail herein.

In embodiments in which the integrated circuit 1400 is part of a system, the host processor 1440 may be configured to manage training of learnable logic networks by scheduling forward-propagation and backpropagation operations on the integrated circuit. The host processor 1440 may further be configured to manage training of learnable logic networks by managing optimizer updates of parameters based on backpropagated values.

FIG. 15 illustrates a cluster dataflow integrated circuit unit 1500 for forwarding and/or backpropagation through logic gate clusters. As illustrated, the integrated circuit unit 1500 may include hardware-implemented computational units 1510 for forward propagation and, in embodiments that support learning, hardware-implemented computational units 1520 for relaxed gate backpropagation. Optional configurable dataflow routing elements 1530 connect two or more relaxed logic gate operators within the cluster dataflow unit. An input interface 1540 receives activations and, in some modes, gradients, while an output interface 1550 provides resulting activations and/or gradients. Gradient aggregation units 1560 aggregate gradients across a vectorization dimension, such as a batch of training samples, and precision or data-format conversion unit(s) 1570 convert between internal and external precisions for activations, gradients, and parameter values, as described in various embodiments herein.

Figure 16:
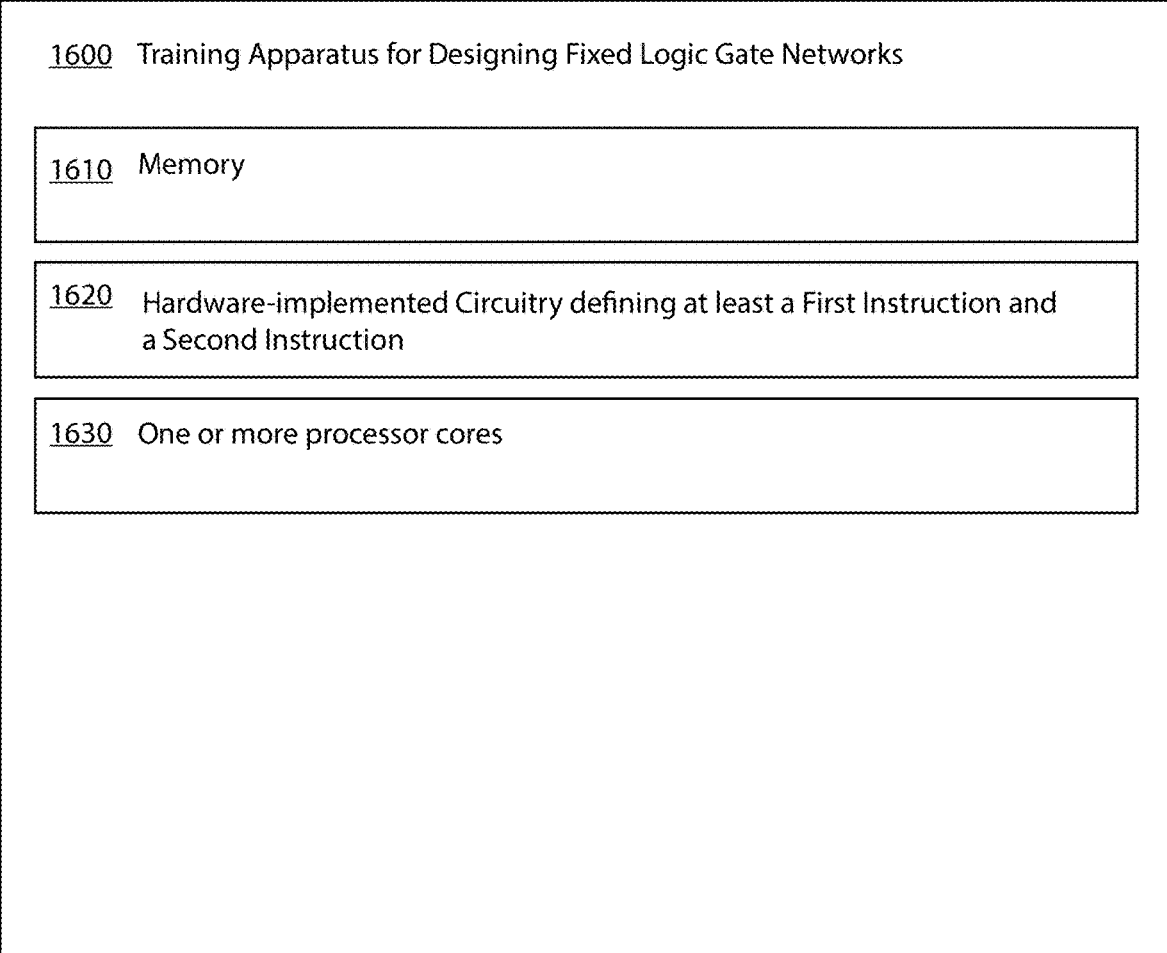
FIG. 16 illustrates an example block diagram of a training apparatus for designing fixed logic gate networks, according to one embodiment.

FIG. 16 illustrates an example block diagram of a training apparatus 1600 for designing fixed logic gate networks, according to one embodiment. As illustrated, and in the context of any combination of the various embodiments described herein, the training apparatus 1600 may include a memory 1610, hardware-implemented circuitry 1620 defining at least a first instruction and a second instruction, and one or more processor cores 1630.

In various embodiments, the memory 1610 may be configured to store activations and parameterizations during training of an inference model. In various embodiments, the first instruction of the hardware-implemented circuitry 1620 may be defined for forwarding activations through a cluster of one or more learnable logic gate operators. In various embodiments, the second instruction of the hardware-implemented circuitry 1620 may be defined for backpropagating through the cluster of one or more learnable logic gate operators. In various embodiments, the one or more processor cores 1630 may have arithmetic units configured to execute additional mathematical instructions suitable for applying optimization algorithms to the parameterizations.

Figure 17:
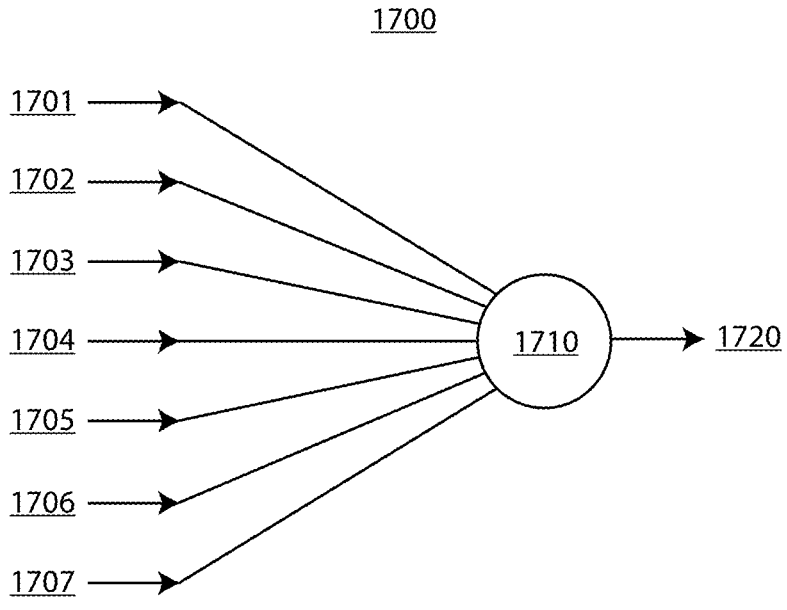
FIG. 17 illustrates a seven-input, one-output learnable logic module or learnable logic engine.

FIG. 17 illustrates a seven-input, one-output learnable logic module 1700 or a learnable logic engine with a single seven-input learnable logic module. The learnable logic module 1710 receives seven activation inputs (1701, 1702, 1703, 1704, 1705, 1706, 1707). The learnable logic module has one activation output 1720. In various embodiments, the learnable logic module may be parameterized via 128 parameters. This may correspond to $2^7=128$, providing a minimal spanning of the entire space of $2^{128}$ $3.4 \cdot 10^{38}$ possible logic gate operators with 7 inputs. In some embodiments, fewer parameters may be used, while in other embodiments, more may be used. For example, it may be sufficient to use fewer parameters to span enough possible logic operator combinations, or, alternatively, it may be advantageous to use more parameters due to improved optimization characteristics at certain parameter counts.

In some embodiments, the function implemented in hardware by the learnable logic module's forward propagation may be $w_0+w_1x_1+w_2x_2+w_3x_3+w_4x_4+w_5x_5+w_6x_6+w_7x_7+$
$w_8x_1x_2+w_9x_1x_3+w_{10}x_1x_4+w_{11}x_1x_5+w_{12}x_1x_6+w_{13}x_1x_7+$
$w_{14}x_2x_3+w_{15}x_2x_4+w_{16}x_2x_5+w_{17}x_2x_6+w_{18}x_2x_7+w_{19}x_3x_4+$
$w_{20}x_3x_5+w_{21}x_3x_6+w_{22}x_3x_7+w_{23}x_4x_5+w_{24}x_4x_6+w_{25}x_4x_7+$
$w_{26}x_5x_6+w_{27}x_5x_7+w_{28}x_6x_7+w_{29}x_1x_2x_3+w_{30}x_1x_2x_4+$
$w_{31}x_1x_2x_5+w_{32}x_1x_2x_6+w_{33}x_1x_2x_7+w_{34}x_1x_3x_4+w_{35}x_1x_3x_5+$
$w_{36}x_1x_3x_6+w_{37}x_1x_3x_7+w_{38}x_1x_4x_5+w_{39}x_1x_4x_6+w_{40}x_1x_4x_7+$
$w_{41}x_1x_5x_6+w_{42}x_1x_5x_7+w_{43}x_1x_6x_7+w_{44}x_2x_3x_4+w_{45}x_2x_3x_5+$
$w_{46}x_2x_3x_6+w_{47}x_2x_3x_7+w_{48}x_2x_4x_5+w_{49}x_2x_4x_6+w_{50}x_2x_4x_7+$
$w_{51}x_2x_5x_6+w_{52}x_2x_5x_7+w_{53}x_2x_6x_7+w_{54}x_3x_4x_5+w_{55}x_3x_4x_6+$
$w_{56}x_3x_4x_7+w_{57}x_3x_5x_6+w_{58}x_3x_5x_7+w_{59}x_3x_6x_7+w_{60}x_4x_5x_6+$
$w_{61}x_4x_5x_7+w_{62}x_4x_6x_7+w_{63}x_5x_6x_7+w_{64}x_1x_2x_3x_4+$
$w_{65}x_1x_2x_3x_5+w_{66}x_1x_2x_3x_6+w_{67}x_1x_2x_3x_7+w_{68}x_1x_2x_4x_5+$
$w_{69}x_1x_2x_4x_6+w_{70}x_1x_2x_4x_7+w_{71}x_1x_2x_5x_6+w_{72}x_1x_2x_5x_7+$
$w_{73}x_1x_2x_6x_7+w_{74}x_1x_3x_4x_5+w_{75}x_1x_3x_4x_6+w_{76}x_1x_3x_4x_7+$
$w_{77}x_1x_3x_5x_6+w_{78}x_1x_3x_5x_7+w_{79}x_1x_3x_6x_7+w_{80}x_1x_4x_5x_6+$
$w_{81}x_1x_4x_5x_7+w_{82}x_1x_4x_6x_7+w_{83}x_1x_5x_6x_7+w_{84}x_2x_3x_4x_5+$
$w_{85}x_2x_3x_4x_6+w_{86}x_2x_3x_4x_7+w_{87}x_2x_3x_5x_6+w_{88}x_2x_3x_5x_7+$
$w_{89}x_2x_3x_6x_7+w_{90}x_2x_4x_5x_6+w_{91}x_2x_4x_5x_7+w_{92}x_2x_4x_6x_7+$
$w_{93}x_2x_5x_6x_7+w_{94}x_3x_4x_5x_6+w_{95}x_3x_4x_5x_7+w_{96}x_3x_4x_6x_7+$
$w_{97}x_3x_5x_6x_7+w_{98}x_4x_5x_6x_7+w_{99}x_1x_2x_3x_4x_5+$
$w_{100}x_1x_2x_3x_4x_6+w_{101}x_1x_2x_3x_4x_7+w_{102}x_1x_2x_3x_5x_6+$
$w_{103}x_1x_2x_3x_5x_7+w_{104}x_1x_2x_3x_6x_7+w_{105}x_1x_2x_4x_5x_6+$
$w_{106}x_1x_2x_4x_5x_7+w_{107}x_1x_2x_4x_6x_7+w_{108}x_1x_2x_5x_6x_7+$
$w_{109}x_1x_3x_4x_5x_6+w_{110}x_1x_3x_4x_5x_7+w_{111}x_1x_3x_4x_6x_7+$
$w_{112}x_1x_3x_5x_6x_7+w_{113}x_1x_4x_5x_6x_7+w_{114}x_2x_3x_4x_5x_6+$
$w_{115}x_2x_3x_4x_5x_7+w_{116}x_2x_3x_4x_6x_7+w_{117}x_2x_3x_5x_6x_7+$
$w_{118}x_2x_4x_5x_6x_7+w_{119}x_3x_4x_5x_6x_7+w_{120}x_1x_2x_3x_4x_5x_6+$
$w_{121}x_1x_2x_3x_4x_5x_7+w_{122}x_1x_2x_3x_4x_6x_7+w_{123}x_1x_2x_3x_5x_6x_7+$
$w_{124}x_1x_2x_4x_5x_6x_7+w_{125}x_1x_3x_4x_5x_6x_7+w_{126}x_2x_3x_4x_5x_6x_7+$
$w_{127}x_1x_2x_3x_4x_5x_6x_7$ for inputs $x_1x_2x_3x_4x_5x_6x_7$, and parameters $w_0$ to $w_{127}$. In some embodiments, this function may be factorized, e.g., for more efficient implementation. Note also here, as also already remarked in various places elsewhere, that the parameters $w_0$ to $w_{127}$ may not always be the parameters that the optimization algorithm may operate on, but that these are, in various embodiments, directly related through non-linear and/or affine transformations with the underlying parameters. While it is not necessary to keep that transformation outside the learnable logic engine, and some embodiments include non-linear functions in the learnable logic engine, keeping it outside can enable greater flexibility in post-manufacturing runtime choice of relaxation. In some other embodiments, alternative relaxations, e.g., but not limited to, based on min/max relaxations, may be used.

Figure 18:
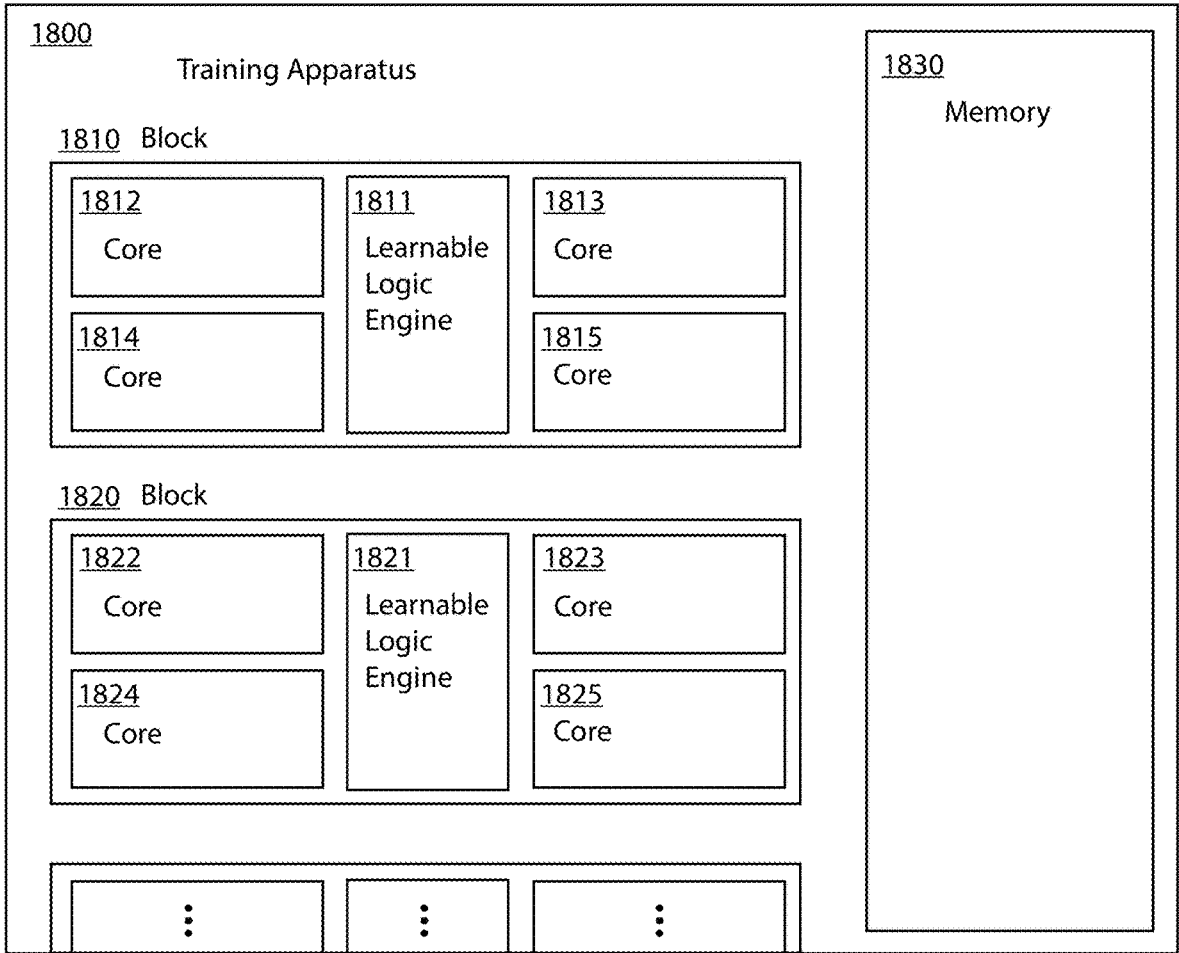
FIG. 18 shows a training apparatus comprising blocks with learnable logic engines and multiple cores with coupled memory.

FIG. 18 illustrates one embodiment of a training apparatus 1800 comprising a number of blocks 1810, 1820, and a coupled memory 1830 for storing parameters and activations. Each block, e.g., 1810, may comprise a learnable logic engine (1811) and multiple cores (1812, 1813, 1814, 1815). The second block 1820 includes a learnable logic engine 1821 and multiple cores (1822, 1823, 1824, and 1825). The training apparatus 1800 may include any number of blocks with any number of learnable logic engines and cores. The choice of four cores is illustrative. Multiple cores jointly load the parameterization into the learnable logic engine, and orchestrate applying the learnable logic engine to inputs to compute outputs, and, during backpropagation, to inputs and output activations to compute input activations and accumulate gradients in the parameterization gradient accumulators.

In some embodiments, the blocks 1810, 1820, etc. may each comprise multiple learnable logic engines, which may be preferred when the learnable logic engines are relatively small, whereas larger learnable logic engines may favor a single one per block with more cores per block.

In some embodiments, loading the parameterization may comprise transforming raw parameters stored in memory into preprocessed parameters. For example, in some embodiments, non-linear functions and/or affine transformations may be applied to original parameters to prepare them for utilization in the learnable logic engine. In some embodiments, the preprocessed parameters to be used by the learnable logic engine may be stored in memory, in addition to the raw optimization parameters. For example, in one embodiment of a 2-input learnable gate, 16 raw parameters may be stored in Float32, transformed into 16 probabilities via a softmax function, and then transformed with a 16×4 matrix into 4 coefficient parameters, which then may be converted into lower precision and are to be used as parameters in the learnable logic engine.

In some other embodiments, there may be 4 raw parameters, which may be transformed nonlinearly into 4 parameters for the learnable logic engine parameterization. In various embodiments, during backpropagation, the gradient with respect to the parameters of the learnable logic engines is first accumulated, and then transformed via backpropagation through the non-linear functions and/or transformations into the raw parameter gradient used in the optimization algorithm.

In some embodiments, these transformations may be performed in the apparatus's general-purpose compute units. This can provide additional post-design flexibility for adjusting the relaxation and, in many embodiments, may not be a bottleneck, since it is required only once per update and optimization often already favors a higher-precision shadow copy of the parameters. In some other embodiments, these transformations are performed within the learnable logic engine. This can have the advantage of alleviating the respective cost, since, in many cases, these transformations can be implemented very efficiently in hardware (e.g., they may comprise a sparse matrix with small-integer coefficients), but specifying them at the stage of hardware design may limit post-design flexibility. In some embodiments, there is no distinction between raw optimization parameters and the parameters in the learnable logic engine, which can be supported by certain relaxations of learnable logic.

Figure 19:
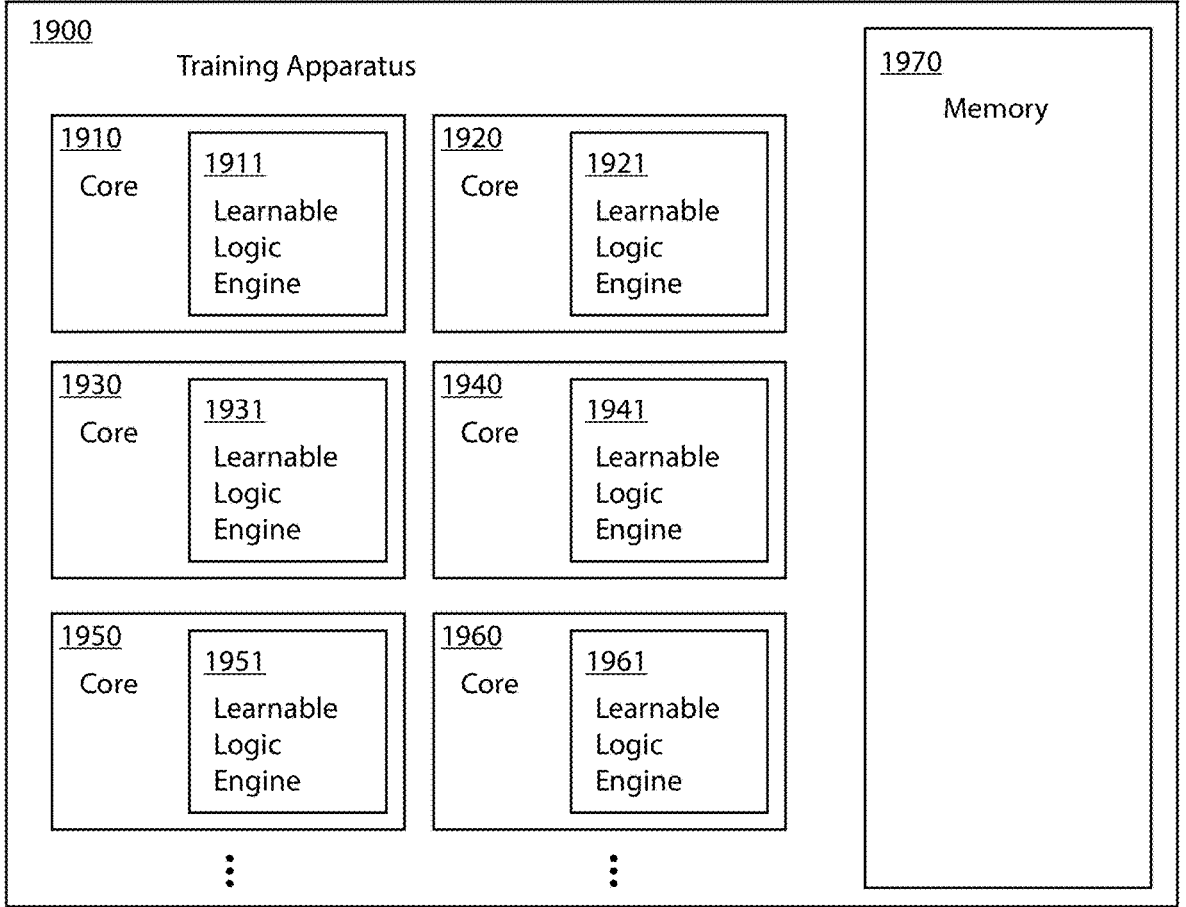
FIG. 19 shows a training apparatus where learnable logic engines are contained within individual cores.

FIG. 19 shows a training apparatus 1900, wherein learnable logic engines 1911, 1921, 1931, 1941, 1951, and 1961 may each be contained in one core 1910, 1920, 1930, 1940, 1950, 1960, or associated with one core. For example, core 1910 may contain learnable logic engine 1911; the same may apply to 1920/1921, 1930/1931, 1940/1941, 1950/1951, and 1960/1961 accordingly. The memory 1970 is provided for storing the parameterization and activations. The cores may orchestrate the use of the learnable logic engine and may also be used for general-purpose computing or auxiliary operations, e.g., to orchestrate elements that are not part of the learnable logic engine. In some embodiments, not all cores have a learnable logic engine; e.g., some cores may be more specialized for general-purpose computations, while others may have tensor/matrix engines, and still others may have learnable logic engines.

Figure 20:
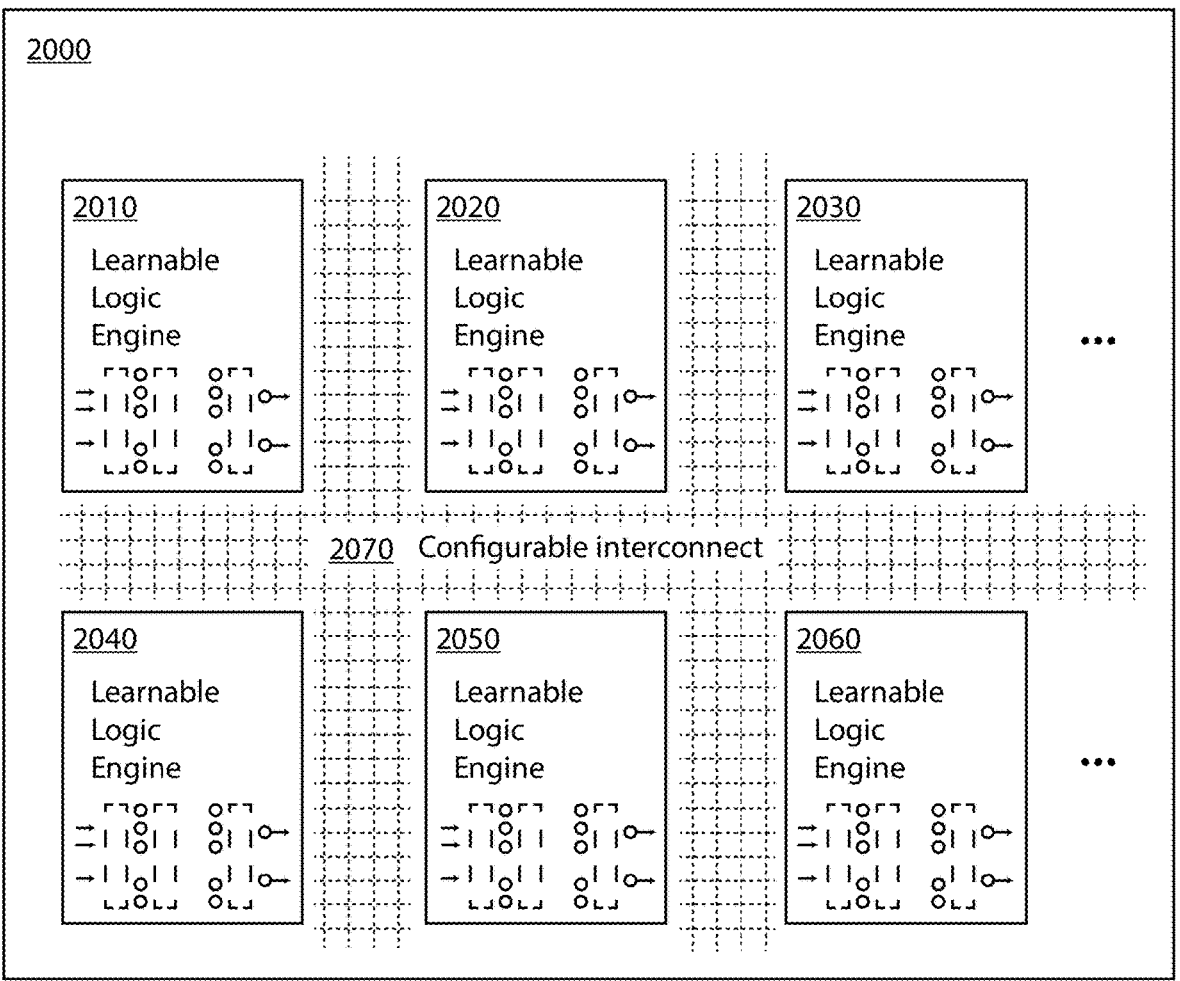
FIG. 20 shows a circuit with a reconfigurable interconnect arrangement of multiple learnable logic engines.

FIG. 20 shows a circuit 2000 with a reconfigurable interconnect 2070 arrangement of a number of learnable logic engines 2010, 2020, 2030, 2040, 2050, 2060, which may optionally be supplemented with an additional memory. The reconfigurable interconnect enables the orchestration of activation propagation between learnable logic engines without consuming memory bandwidth, thereby enabling significantly higher throughput. However, a disadvantage of this configuration may be the cost of either storing checkpoint activations or recomputing more during backpropagation, as well as potential limitations in flexibility. For example, the dataflow may not enable new modules that were not provisioned for in the pre-fabrication phase. In some embodiments with more general-purpose compute, these new modules may be implemented in software between executions of learnable logic engines.

In some embodiments, circuit 2000 may be implemented as a super-learnable logic engine, for example, connected to a core or a set of cores, like in apparatuses 1800 or 1900. In some embodiments, when parameterizations reside in learnable logic engines, e.g., throughout both the full forward and backpropagations, the number of parameters supported per training apparatus may be limited, e.g., on the orders of a hundred thousand or a few million learnable gates, while higher throughputs may be enabled, e.g., up to the orders of 10 or 100 million examples per second may be supported. In those embodiments, it can be helpful to utilize multiple training apparatuses, connected via fast and/or high-bandwidth interconnects, e.g., optical interconnects.

FIG. 21 shows some embodiments of two learnable logic engines, 2100 and 2150, with extended functionalities. Learnable logic engines 2100 and 2150 includes columns of learnable logic gate operators 2120, 2130, 2140, 2160, 2170, and 2180. Learnable logic engine 2100 provides an extension that enables recurrence within a learnable logic engine. For example, instead of, or in addition to, providing a vectorized batch of inputs, multiple input activations along a given input may correspond to a time dimension. This may correspond to, e.g., but not limited to, the dimension along a sequence of tokens, a linearized image, or a time series. The connections (or options for connections) between learnable gates in the learnable logic engine may support feeding the output of a later-layer gate into the input of another layer gate, e.g., the same or an earlier layer's input, but at a later time. This is illustrated at 2113, e.g., moving activations from interconnect 2112 to interconnect 2111 or to interconnect 2110 and/or moving activations from interconnect 2111 to interconnect 2110. These recurrent output activations may be pipelined and stored until used in a future (along the time dimension) with a future input activation. During backward mode operation, in some embodiments, the recurrent activations may have to be recomputed to orchestrate backpropagation.

In some other embodiments, the recurrence may be orchestrated via relaxations that enable storing the path along which backpropagates, e.g., using a single bit to represent a logical OR. These choices may, in some embodiments, be stored in memory and retrieved for backward operation. In some other embodiments, selected recurrent activations or checkpoints are also stored in memory, reducing the need for re-forward-computation during backpropagation. Generally, in many embodiments, re-computations may be cheaper than retrieving from memory due to the fact that memory transactions are generally substantially more expensive (e.g., more expensive with respect to energy than computations).

FIG. 21 further shows one embodiment of a learnable logic engine 2150 with a flip-flop emulator (FFE in the figure) or a flip-flop emulator queue (FFEQ in the figure). These may be provided in one or more interconnects, e.g., in the figure at 2191 within 2190, at 2193 within 2192, and/or at 2195 within 2194. These support emulating flip-flops or flip-flop queues between learnable gates in the learnable logic engine. This may be helpful, e.g., when training a convolutional logic gate network, wherein the parameters may be shared for different input activations of a singular example, e.g., for different locations of an image, or different times in a time series. Similar discussions regarding recurrence apply, e.g., the vectorization dimension of the activations may also span different image locations or a data dimension. This may orchestrate efficient training of convolutional logic gate networks, reducing memory bandwidth or memory transaction requirements. In some embodiments, applying an entire learnable logic engine as a single convolutional function application may alternatively, or in addition, be orchestrated using more flexible compute cores or a configurable interconnect between learnable logic engines.

The embodiments of 2100 and 2150 may be combined, provisioning for both recurrence and convolutions. In some embodiments, recurrence and/or convolution are provided as options in the learnable logic engine, but are not always used; e.g., they may be provided if a certain configuration bit is set.

Figure 22:
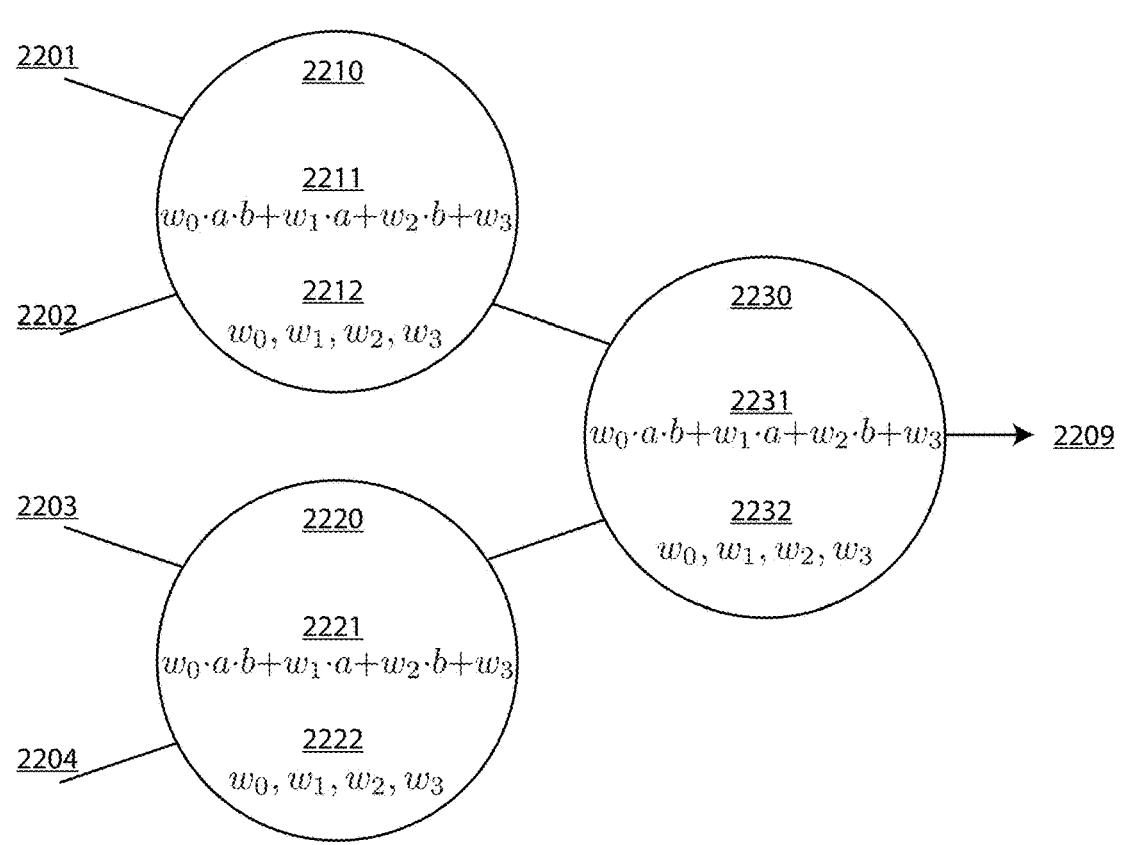
FIG. 22 illustrates an example of forward computation performed by three two-input gates within a learnable logic engine.

FIG. 22 illustrates an example of one embodiment of a forward computation performed by three two-input gates within a learnable logic engine. A layer of two learnable gates (2210, 2220) is followed by one learnable gate 2230. Four input activations, 2201, 2202, 2203, and 2204, may be provided and processed by the first layer 2210 and 2220. In the learnable gate module 2210, four parameters 2212 are present, and are processed by computational circuits implementing, e.g., $w_0 \cdot a \cdot b + w_1 \cdot a + w_2 \cdot b + w_3$ 2211. The output activation may be fed forward into the next layer of learnable logic modules as an input activation. For 2220 and 2230, it is analogous, with parameters 2222 and 2232 and computational circuits implementing 2221 and 2231, respectively. It is appreciated that the notation of parameter symbols is the same in each node here, while they may represent per-node independent sets of parameters. The eventual output activation 2209 may correspond to the output of the learnable logic engine.

Figure 23:
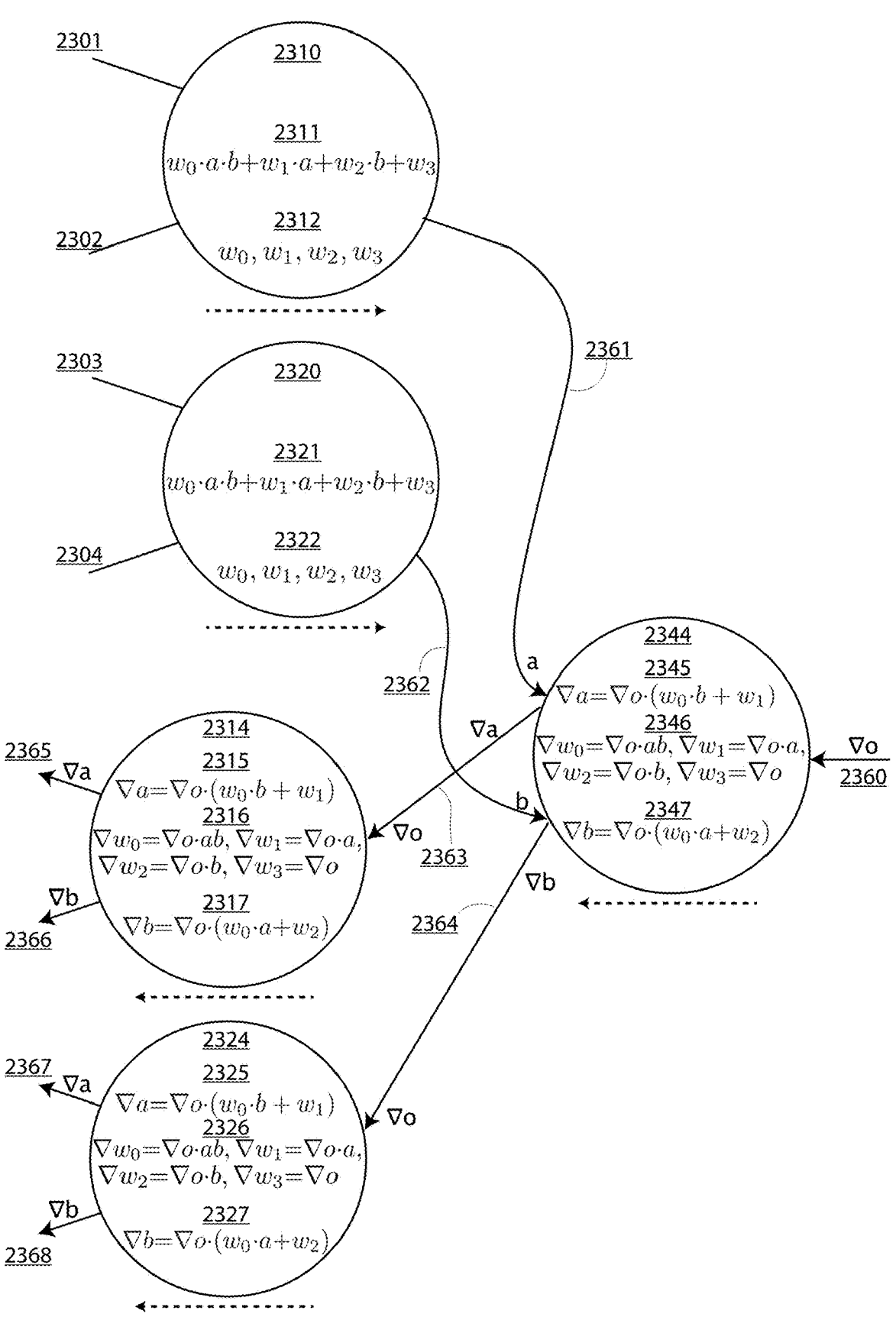
FIG. 23 illustrates computations during backpropagation corresponding to the learnable logic engine portion shown in FIG. 22.

FIG. 23 illustrates one embodiment of the computations during backpropagation of the part of the learnable logic engine illustrated in FIG. 22. This may be within the same learnable logic engine, or may be in a separate backpropagation logic engine. Since the intermediate activations between the layers were not stored in FIG. 22, they need to be recomputed during backpropagation. Modules 2310 and 2320 correspond to 2210 and 2220, producing two intermediate activations, 2361 and 2362, as a and b, respectively. The activations are fed into the last-layer backpropagation module 2344. Further, 2344 receives an output gradient 2360 $\nabla$o. The module 2344 computes the gradients with respect to input a at 2345 and with respect to b at 2347, as well as with respect to the parameters at 2346 and accumulated. The input gradient with respect to a, computed at 2345, is forward at 2363 as (in relation to 2344) $\nabla$a and then (in relation to 2314) as $\nabla$o. The computations as in 2344 apply to 2314, and the input activations are already available at 2301, 2302, and may be used. The computations as in 2314 apply to 2324, the output gradient is provided via 2364, and the input activations are already available at 2303, 2304, and may be used. The earlier level of nodes may then return the output, which are the input activations 2365, 2366, 2367, and 2368. The parameter gradients 2346, 2316, 2326 are accumulated in the parameter gradient accumulators for the respective nodes. The module 2310 computes 2311 with parameters 2312. The module 2320 computes 2321 with parameters 2322. Module 2314 computes 2315, 2316, and 2317. Module 2324 computes 2325, 2326, and 2327.

Figure 24:
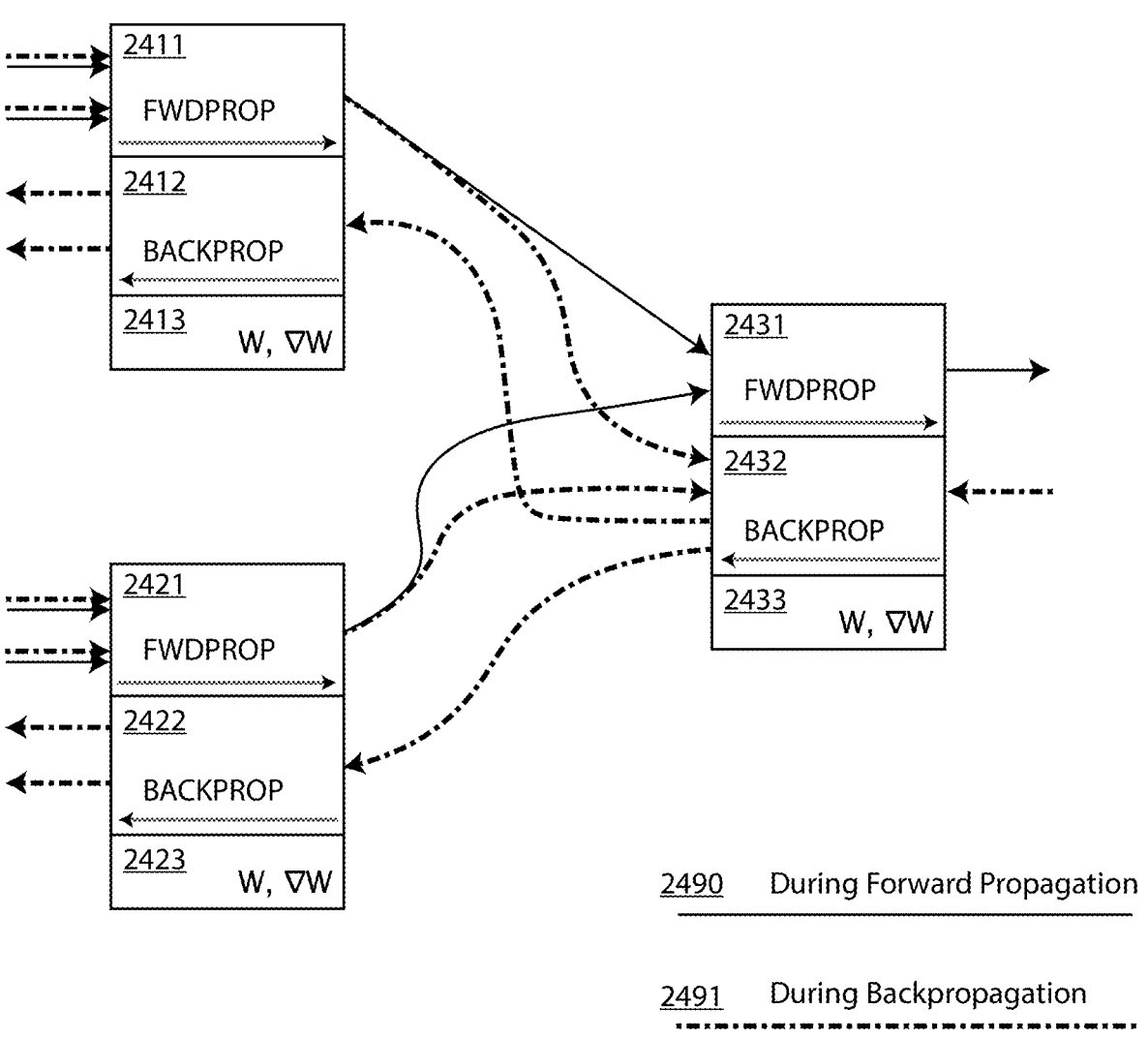
FIG. 24 illustrates a schematic overview of forward and backward propagation data flow corresponding to FIGS. 22 and 23.

FIG. 24 illustrates one embodiment corresponding to FIG. 22 and FIG. 23 more schematically to provide a more general overview. The thin lines 2490 represent data flow during forward propagation, while the thick dash-dotted lines 2491 represent data flow during backward propagation. During forward propagation, inputs are fed to modules 2411 and 2421, forward-propagated through them, and their outputs are fed to module 2431, which then forward-propagates its output downstream. During backpropagation, an output gradient is fed to module 2432. However, the input activations to module 2432 may not be available; accordingly, the inputs are fed to modules 2411 and 2421, forward-propagated through them, and then their outputs are fed to module 2432. Then, module 2432 may compute the parameter gradient and/or update the parameter gradient accumulator 2433, and provide input gradients to modules 2412 and 2422, respectively. Inputs may already be available from 2411 and 2421, respectively, so 2412 and 2422 may compute the parameter gradients for 2413 and 2423, and then feed their input gradients upstream.

Figure 26:
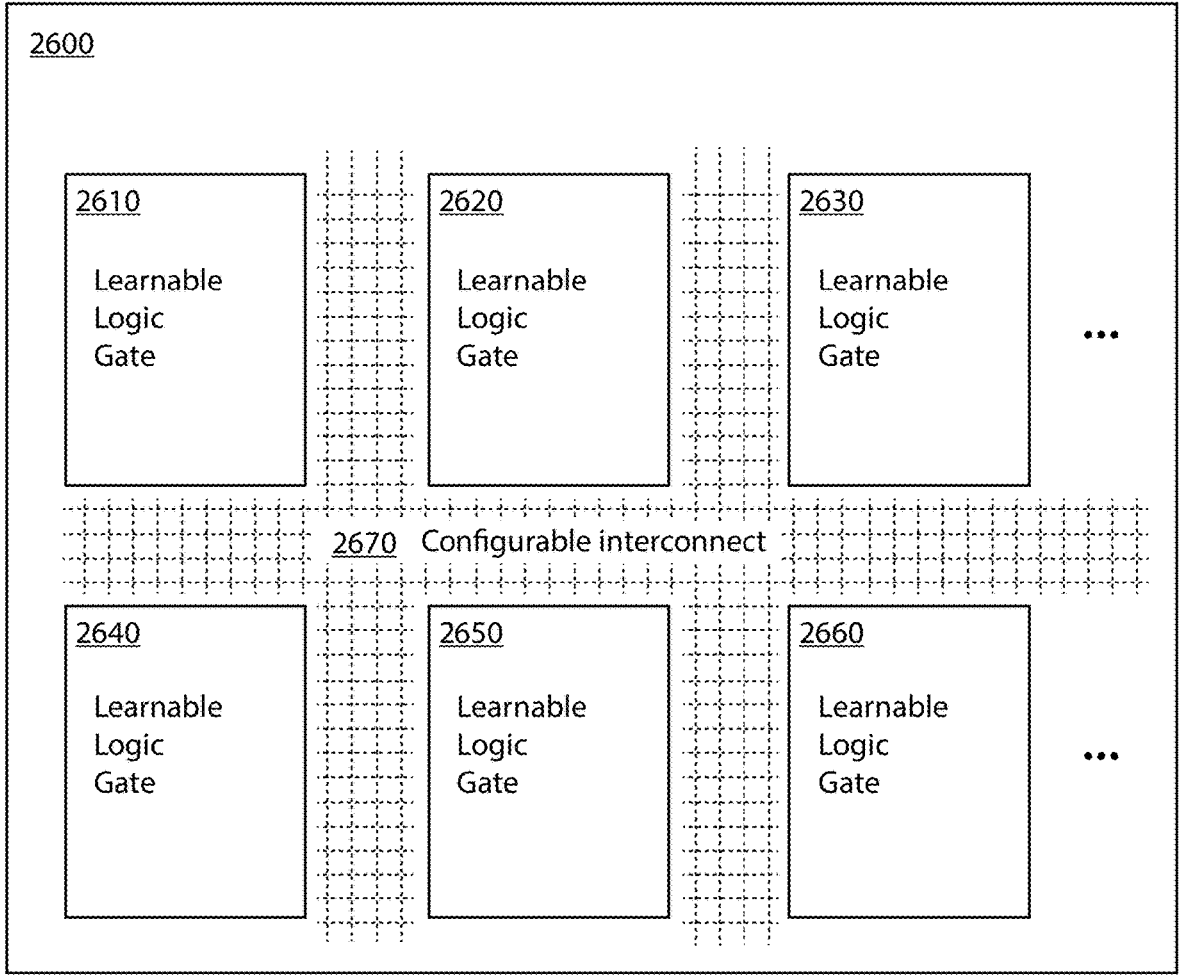
FIG. 26 illustrates a learnable logic engine comprising multiple learnable logic gate modules and a configurable interconnect.

FIG. 26 illustrates one embodiment of a learnable logic engine 2600 that comprises a number of learnable logic gate modules 2610, 2620, 2630, 2640, 2650, and 2660, as well as a configurable interconnect 2670. In some embodiments, the number of inputs for different learnable logic gates may differ within the learnable logic engine, while, in some other embodiments, the number of inputs for different learnable logic gates may be constant within the learnable logic engine. The configurable interconnect provides enhanced flexibility in the topology and arrangement within the learnable logic engine. In some embodiments, the configurable interconnect provides single-bit connections that can be routed in combination with multi-bit connections, e.g., corresponding to activation or gradient precisions. The latter may be more efficient than bit-level connections, since it provides less flexibility but allows many transactions across the interconnect to use activation and activation gradient precisions. In some embodiments, the activation and activation gradient precisions within the learnable logic engine may be higher than those stored in memory, providing a favorable trade-off: memory is minimized, local connections are cheap, and precision is enhanced.

In some embodiments, the interconnect 2670 also connects to registers, flip-flops, and/or shift registers. This can, e.g., enable recurrence to be implemented efficiently. In some embodiments, BRAMs or other memories are locally available within the interconnect of the learnable logic engine, thereby providing additional storage for greater flexibility. In some embodiments, the configurable interconnect may also comprise LUTs, e.g., as in an FPGA, as well as other FPGA features, enabling a high level of post-manufacturing flexibility for the learnable logic engine. This may enable, e.g., settings that support a wide range of topologies, including non-foreseen features during the manufacturing of the training apparatus. In some embodiments, respective reconfigurable FPGA features expressed in circuitry between learnable logic engines or within a learnable logic engine is referred to as field-programmable-gate-array-functionality.

Figure 27:
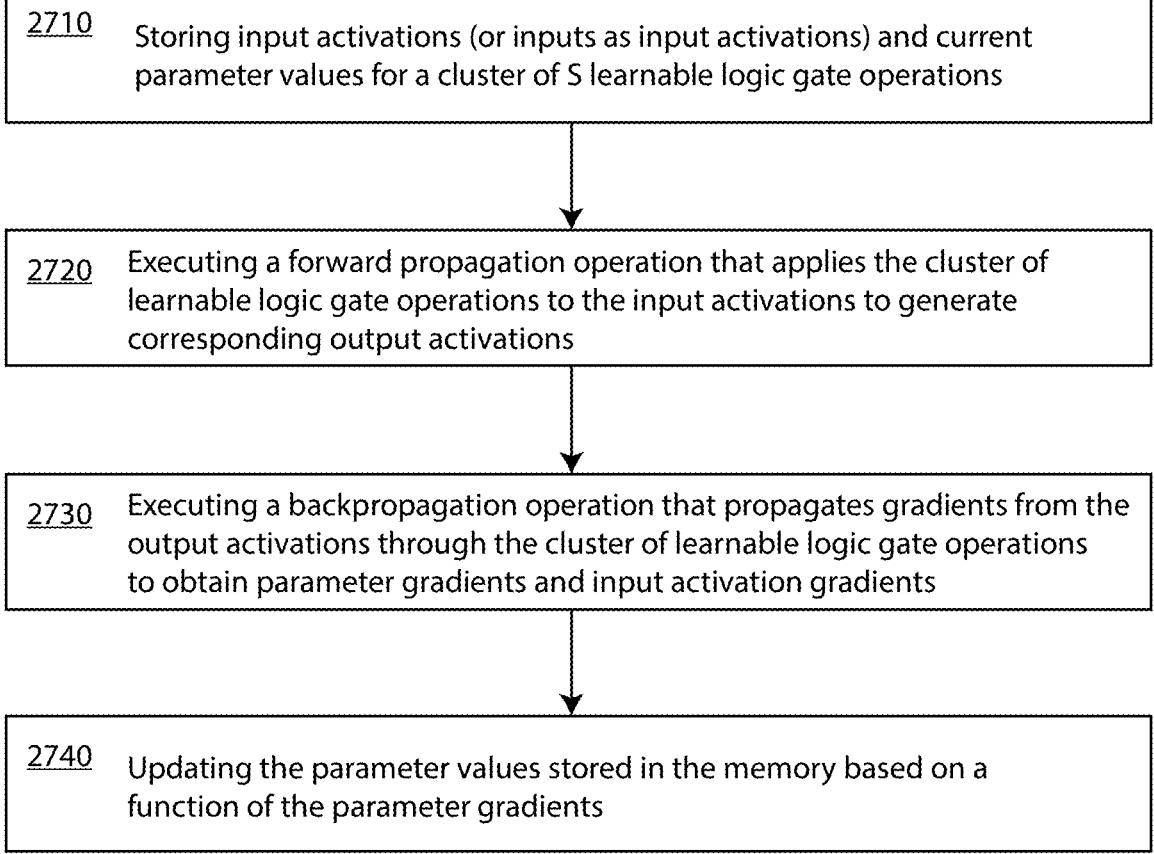
FIG. 27 illustrates a method of training a learnable logic network using an integrated circuit, according to one embodiment.

FIG. 27 illustrates a method of training a learnable logic network using an integrated circuit, according to one embodiment. As previously noted, the steps of a method, including those illustrated, described herein, or claimed, do not necessarily need to be executed in any specific order or even sequentially, nor do the steps need to be executed only once unless otherwise specified. The illustrated method may be, for example, used to train a learnable logic network using an integrated circuit that comprises memory configured to store activation values and parameter values of the learnable logic network and one or more hardware-implemented learnable logic engines coupled to the memory, wherein one or more of the learnable logic engines is configured to process a plurality N of input activations and generate a plurality M of output activations through S learnable logic gate operations that implement differentiable relaxations of Boolean logic gate operations.

The system may store, at 2710, input activations and current parameter values for a cluster of the S learnable logic gate operations. For example, the input activations and current parameter values may be stored in a memory. The system may execute, at 2720, a forward propagation operation that applies the cluster of learnable logic gate operations to the input activations to generate corresponding output activations. For example, the system may execute the forward propagation operation by at least one of the learnable logic engines. The system may execute, at 2730, a backpropagation operation that propagates gradients from the output activations through the cluster of learnable logic gate operations to obtain parameter gradients and input activation gradients. For example, the system may execute the backpropagation operation by at least one of the learnable logic engines. The system may update, at 2740, the parameter values stored in the memory based on a function of the parameter gradients. For example, the system may update the parameter values by one or more processing cores coupled to one or more learnable logic engines.

Figure 28:
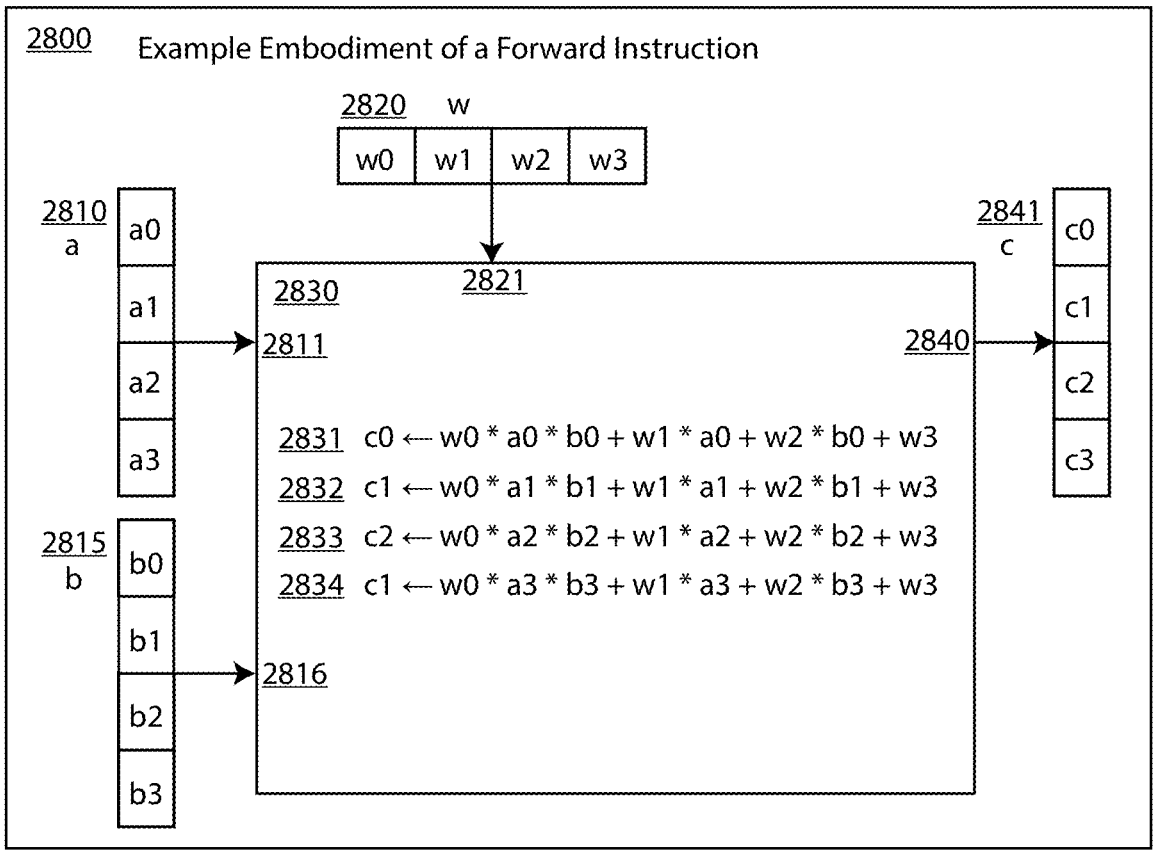
FIG. 28 illustrates a vectorized forward propagation instruction of a two input learnable logic gate, according to one embodiment.

FIG. 28 illustrates a vectorized forward propagation instruction of a two-input learnable logic gate 2800, according to one embodiment. A hardware-implemented vectorized instruction may be configured for forward propagation through a learnable logic gate operator, wherein the learnable logic operator has at least two vectorized activation inputs, at least one vectorized output, and parameterization is provided through four or more parameters. The illustrated example includes two vectorized activation inputs (a) 2810, and (b) 2815, which each comprise four values a0, a1, a2, and a3, as well as b0, b1, b2, and b3, respectively. Herein, a0 may be processed jointly with b0, a1 may be processed jointly with b1, a2 may be processed jointly with b2, and a3 may be processed jointly with b3. In some embodiments, the number of elements for each input activation may differ. In one embodiment, the datatype of 2810 corresponds to a vectorized datatype of 32 bits, with four values having 8 bits each, representing values between 0 and 1, e.g., but not limited to, four uint8 values with a respective interpretation of values ranging from 0 to 1. In some embodiments, non-uniform quantization may be utilized.

The parameters 2820 may be provided, e.g., as one vectorized datatype with four elements, w0, w1, w2, w3. Within the hardware-implemented instruction 2830, the inputs may be processed, optionally converted, and/or divided into their components at 2811, 2816, and 2821. At 2831, the first input activation pair (a0, b0) may be processed, computing $c0 \leftarrow w0*a0*b0+w1*a0+w2*b0+w3$ or a function thereof. Respectively, for the other input activation pairs, outputs may be generated analogously at 2832, 2833, and 2834. In various embodiments, the same parameters may be shared across the respective applications. The output may be packed into a datatype including optional data conversion or quantization at 2840, leading to an output element 2841, comprising c0, c1, c2, and c3.

In various embodiments, the number of vectorized inputs, the configuration of the vectorization, the precision, the number of parameters, their bit-level configuration, the choice of relaxation, and the number of outputs may be varied.

In various embodiments, the choice of relaxation may be varied. The examples provided below illustrates possible choices of relaxation, but are not intended to be limiting and are provided by way of example only, instead of $cX \leftarrow w0*aX*bX+w1*aX+w2*bX+w3$ for some integer X, alternatively, and not limited to, it may use: $cX \leftarrow f(w0*aX*bX+w1*aX+w2*bX+w3)$, $cX \leftarrow w0*aX*bX+w1*aX*(1-bX)+w2*(1-aX)*bX+w3*(1-aX)*(1-bX)$, $cX \leftarrow \max(w0*\min(aX, bX), w1*\min(aX,1-bX), w2*\min(1-aX, bX), w3*\min(1-aX, 1-bX))$, $cX \leftarrow \max(\min(w0, aX, bX), \min(w1, aX, 1-bX), \min(w2, 1-aX, bX), \min(w3, 1-aX, 1-bX))$, $cX \leftarrow \perp(T(w0, aX, bX), T(w1, aX, \neg bX), T(w2, \neg aX, bX), T(w3, \neg aX, \neg bX))$, $cX \leftarrow \perp(\perp(T(T(w0, aX),bX), T(T(w1,aX),\neg bX)), \perp(T(T(w2,\neg aX),bX), T(T(w3,\neg aX),\neg bX)))$, $cX \leftarrow \perp(\perp(T(w0,T(aX,bX)), T(w1,T(aX,\neg bX))), \perp(T(w2,T(\neg aX,bX)), T(w3,T(\neg aX,\neg bX))))$, $cX \leftarrow \perp(\perp(\perp(T(T(w0,aX),bX), T(T(w1,aX),\neg bX)), T(T(w2,\neg aX),bX)), T(T(w3,\neg aX),\neg bX))$, $cX \leftarrow \perp(T(w0,T(aX,bX)), \perp(T(w1,T(aX,\neg bX)), \perp(T(w2,T(\neg aX,bX)), T(w3,T(\neg aX,\neg bX)))))$, $cX \leftarrow \perp(\perp(T(T(w0,aX),bX), T(T(w2,\neg aX),bX)), \perp(T(T(w1,aX),\neg bX), T(T(w3,\neg aX),\neg bX)))$, $cX \leftarrow \perp(T(aX, \perp(T(w0,bX), T(w1,\neg bX))), T(\neg aX, \perp(T(w2,bX), T(w3,\neg bX))))$, $cX \leftarrow \perp(T(bX, \perp(T(w0,aX), T(w2,\neg aX))), T(\neg bX, \perp(T(w1,aX), T(w3,\neg aX))))$, $cX \leftarrow \neg \perp(\neg \perp(\neg w0,\neg aX,\neg bX), \neg \perp(\neg w1,\neg aX,bX), \neg \perp(\neg w2,aX,\neg bX), \neg \perp(\neg w3,aX,bX))$, $cX \leftarrow \neg T(\neg T(w0,aX,bX), \neg T(w1,aX,\neg bX), \neg T(w2,\neg aX, bX), \neg T(w3,\neg aX,\neg bX))$, or $cX \leftarrow \neg T(\perp(\neg w0,\neg aX,\neg bX), \perp(\neg w1,\neg aX,bX), \perp(\neg w2,aX,\neg bX), \perp(\neg w3,aX,bX))$, among various other alternatives, for some function $f$ or for some t-norm T and t-conorm $\perp$, where $\neg x$ may be $1-x$. In some instances, the system may use different t-norms T and/or different t-conorm $\perp$ within one computation. For example, in some embodiments, probabilistic and min/max may be mixed. In various embodiments, extensions of the above embodiments may include more inputs and/or more parameters. Respective backpropagation instructions may also be implemented according to descriptions in the disclosure.

Any of the embodiments described herein may be modified, adapted, and/or otherwise combined in part or in full with other embodiments or combinations of embodiments described herein. All combinations and permutations of the elements, features, and limitations recited in the appended claims are expressly contemplated as being within the scope of this disclosure. The claims themselves form an integral part of the disclosure and describe embodiments that may be practiced individually or in any combination consistent with their dependencies. Where a claim refers to an element or feature "according to any claim," such references encompass all technically possible combinations of the respective subject matter. Unless otherwise stated, the recitation of a particular feature or limitation in a dependent claim does not preclude the inclusion of additional features or limitations described elsewhere herein or in other claims.

This disclosure has been made with reference to various embodiments, including the best mode. However, those skilled in the art will recognize that changes and modifications may be made to the various embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure as encompassed by the claims below, which form a part of this disclosure.

What is claimed is:

1. An integrated circuit for training learnable logic networks, comprising:
   memory configured to store activation values and parameter values of a learnable logic network; and
   one or more hardware-implemented learnable logic engines, at least one of the one or more learnable logic engines being configured to:
      process a plurality N of input activations, where N is an integer greater than or equal to two, and
      to generate M output activations, where M is an integer greater than or equal to one, through S learnable logic gate operations, where S is an integer greater than or equal to one,
   wherein at least one of the one or more learnable logic engines is configured to process multiple sets of inputs using shared parameter values.

2. The integrated circuit of claim 1, further comprising configurable interconnect circuitry between the one or more learnable logic engines, the configurable interconnect circuitry being configured to route activations and gradients between one or more outputs and one or more inputs of one or more learnable logic engines.

3. The integrated circuit of claim 1, wherein one or more of the learnable logic engines comprises internal reconfigurable interconnect circuitry with one or more learnable logic operators, the internal reconfigurable interconnect circuitry being configured to internally route activations and gradients within the learnable logic engine.

4. The integrated circuit of claim 3, wherein at least one of the one or more learnable logic engines is configured to process multiple sets of inputs using shared parameter values.

5. The integrated circuit of claim 1, wherein at least one of the one or more learnable logic engines maintains different numerical precisions for forward-propagation input activations and for gradients used during backpropagation, and wherein the forward-propagation input activations are represented using at most twelve bits of precision.

6. The integrated circuit of claim 1, wherein, for at least one of the learnable logic engines, a precision of input activations is less than a precision of input activation gradients.

7. The integrated circuit of claim 1, wherein some of the hardware-implemented learnable logic engines are for forward propagation, and wherein some of the hardware-implemented learnable logic engines are for backward propagation.

8. The integrated circuit of claim 1, wherein at least one of the one or more learnable logic engines supports configurable connectivity between the learnable logic gate operations, the configurable connectivity being specified by configuration bits that control interconnections among inputs and outputs of the learnable logic gate operations within the learnable logic engine.

9. The integrated circuit of claim 1, further comprising gradient accumulation buffers co-located with or within one or more learnable logic engines, wherein each gradient accumulation buffer is configured to accumulate parameter gradients.

10. The integrated circuit of claim 1, wherein one or more learnable logic gate operations realize a parameterized relaxation of a choice of a logic operator from a set of at least two logic operators, including Boolean operations and wiring options, and
   wherein the Boolean operations and wiring options comprise at least one of: AND operators, OR operators, NAND operators, NOR operators, XOR operators, XNOR operators, inverter operators, and direct-connection operators.

11. The integrated circuit of claim 1, wherein at least one of the learnable logic engines hardware-implements at least one of the learnable logic gate operators using polynomial computations.

12. The integrated circuit of claim 1, wherein at least one of the learnable logic engines hardware-implements at least one of the learnable logic gate operators using probabilistic relaxations.

13. The integrated circuit of claim 1, wherein at least one of the learnable logic engines hardware-implements at least one of the learnable logic gate operators using fuzzy-logic operations.

14. The integrated circuit of claim 1, wherein at least one of the one or more learnable logic engines has at least three inputs and performs exactly one learnable logic gate operation.

15. The integrated circuit of claim 1, wherein at least one of the learnable logic engines supports a vectorized dimension over input activations such that, when loading a parameterization, the parameterization is reused for a plurality of input sets.

16. The integrated circuit of claim 1, further comprising:
   a vectorized data type for input activation gradients of the learnable logic engine; and
   a hardware-implemented atomic addition instruction for the vectorized data type of the input activation gradients.

17. The integrated circuit of claim 1, wherein at least one of the one or more learnable logic engines comprises circuitry for computing $w_0 \cdot a \cdot b + w_1 \cdot a + w_2 \cdot b + w_3$, wherein a, b are functions also dependent on input activations and $w_0$, $w_1$, $w_2$, $w_3$ are functions also dependent on the parameters.

18. The integrated circuit of claim 1, wherein the memory is coupled to the one or more hardware-implemented learnable logic engines,
   wherein one or more learnable logic gate operations realize a parameterized relaxation of a choice of a logic operator from a set of at least two logic operators, including Boolean operations and wiring options,
   wherein the Boolean operations and wiring options comprise at least one of: AND operators, OR operators, NAND operators, NOR operators, XOR operators, XNOR operators, inverter operators, and direct-connection operators,
   wherein the learnable logic engine performs at least two learnable logic gate operations, and after forward propagating through the learnable logic engine, some intermediate activations are not stored in the memory,
   wherein, during backpropagation through the learnable logic engine, the intermediate activations not stored in the memory are recomputed rather than retrieved from the memory, and
   wherein at least one of the learnable logic engines supports a vectorized dimension over input activations such that, when loading a parameterization, the parameterization is reused for a plurality of input sets.

19. The integrated circuit of claim 1, wherein at least one of the one or more learnable logic engines is configured to:

process a plurality N of input activations and a plurality M of output activation gradients, where N is an integer greater than or equal to two and M is an integer greater than or equal to one, and to generate a plurality N of input activation gradients, through S learnable logic gate operations, where S is an integer greater than or equal to one.

20. The integrated circuit of claim 1, further comprising:

a hardware-implemented vectorized instruction configured for forward propagation through a learnable logic gate operator, wherein the learnable logic operator has:

at least two vectorized activation inputs, at least one vectorized output, and a parameterization is provided through three or more parameters, and wherein the vectorized instruction processes the vectorized activation inputs, each vectorized activation input comprising two or more activation values, each activation value represented by no more than sixteen bits of precision.

21. The integrated circuit of claim 20, wherein the hardware-implemented vectorized instruction has three inputs, comprising: two input activation sets a, b with each 4 vectorized activations $(a_0, a_1, a_2, a_3, b_0, b_1, b_2, b_3)$ of each 8-bit precision, each of the two sets represented via one vectorized datatype with 32 bits, and one parameterization vector with four parameters, $w_0, w_1, w_2, w_3$ represented via one vectorized datatype with at most 32; and wherein the hardware-implemented vectorized instruction provides one output activation set c with 4 vectorized activations $(c_0, c_1, c_2, c_3)$ of each 8-bit precision, represented via one vectorized datatype with 32 bits, and wherein the hardware-implemented vectorized instruction computes $c_0$ as a function of $w_0 \cdot a_0 \cdot b_0 + w_1 \cdot a_0 + w_2 \cdot b_0 + w_3$, computes $c_1$ as a function of $w_0 \cdot a_1 \cdot b_1 + w_1 \cdot a_1 + w_2 \, b_1 + w_3$, computes $c_2$ as a function of $w_0 \cdot a_2 \cdot b_2 + w_1 \cdot a_2 + w_2 \, b_2 + w_3$, and computes $c_3$ as a function of $w_0 \cdot a_3 \cdot b_3 + w_1 \cdot a_3 + w_2 \, b_3 + w_3$.

22. The integrated circuit of claim 1, wherein at least one of the one or more learnable logic engines utilizes a parameterization that non-linearly depends on a parameterization used by an optimization algorithm.

23. The integrated circuit of claim 1, wherein at least one of the one or more learnable logic engines has at least four inputs and performs at least two learnable logic gate operations.

24. The system claim 1, wherein at least one of the learnable logic engines hardware-implements a learnable logic gate operator that realizes a differentially parameterized selection of a logic gate operator from among a set of Boolean operations and wiring options, the learnable logic gate operator being implemented using at least one of polynomial computations, probabilistic relaxations, and fuzzy-logic operations.

25. An integrated circuit for training learnable logic networks, comprising:

memory configured to store activation values and parameter values of a learnable logic network; and one or more hardware-implemented learnable logic engines, at least one of the one or more learnable logic engines being configured to:

process a plurality N of input activations, where N is an integer greater than or equal to two, and to generate M output activations, where M is an integer greater than or equal to one, through S learnable logic gate operations, where S is an integer greater than or equal to one, wherein the learnable logic engine performs at least two learnable logic gate operations, and after forward propagating through the learnable logic engine, some intermediate activations are not stored in the memory, and wherein, during backpropagation through the learnable logic engine, the intermediate activations not stored in the memory are recomputed rather than retrieved from the memory.

26. The integrated circuit of claim 25, further comprising configurable interconnect circuitry between the one or more learnable logic engines, the configurable interconnect circuitry being configured to route activations and gradients between one or more outputs and one or more inputs of one or more learnable logic engines.

27. The integrated circuit of claim 25, wherein one or more of the learnable logic engines comprises internal reconfigurable interconnect circuitry with one or more learnable logic operators, the internal reconfigurable interconnect circuitry being configured to internally route activations and gradients within the learnable logic engine.

28. The integrated circuit of claim 25, wherein at least one of the one or more learnable logic engines maintains different numerical precisions for forward-propagation input activations and for gradients used during backpropagation, and wherein the forward-propagation input activations are represented using at most twelve bits of precision.

29. The integrated circuit of claim 25, wherein, for at least one of the learnable logic engines, a precision of input activations is less than a precision of input activation gradients.

30. The integrated circuit of claim 25, wherein some of the hardware-implemented learnable logic engines are for forward propagation, and wherein some of the hardware-implemented learnable logic engines are for backward propagation.

31. The integrated circuit of claim 25, wherein at least one of the one or more learnable logic engines supports configurable connectivity between the learnable logic gate operations, the configurable connectivity being specified by configuration bits that control interconnections among inputs and outputs of the learnable logic gate operations within the learnable logic engine.

32. The integrated circuit of claim 25, further comprising gradient accumulation buffers co-located with or within one or more learnable logic engines, wherein each gradient accumulation buffer is configured to accumulate parameter gradients.

33. The integrated circuit of claim 25, wherein one or more learnable logic gate operations realize a parameterized relaxation of a choice of a logic operator from a set of at least two logic operators, including Boolean operations and wiring options, and wherein the Boolean operations and wiring options comprise at least one of: AND operators, OR operators, NAND operators, NOR operators, XOR operators, XNOR operators, inverter operators, and direct-connection operators.

34. The integrated circuit of claim 25, wherein at least one of the learnable logic engines hardware-implements at least one of the learnable logic gate operators using polynomial computations.

35. The integrated circuit of claim 25, wherein at least one of the learnable logic engines hardware-implements at least one of the learnable logic gate operators using probabilistic relaxations.

36. The integrated circuit of claim 25, wherein at least one of the learnable logic engines hardware-implements at least one of the learnable logic gate operators using fuzzy-logic operations.

37. The integrated circuit of claim 25, wherein at least one of the one or more learnable logic engines utilizes a parameterization that non-linearly depends on a parameterization used by an optimization algorithm.

38. The integrated circuit of claim 25, wherein at least one of the one or more learnable logic engines has at least four inputs and performs at least two learnable logic gate operations.

39. The integrated circuit of claim 25, wherein at least one of the one or more learnable logic engines has at least three inputs and performs exactly one learnable logic gate operation.

40. The integrated circuit of claim 25, wherein at least one of the learnable logic engines supports a vectorized dimension over input activations such that, when loading a parameterization, the parameterization is reused for a plurality of input sets.

41. The integrated circuit of claim 25, further comprising:

a vectorized data type for input activation gradients of the learnable logic engine; and a hardware-implemented atomic addition instruction for the vectorized data type of the input activation gradients.

42. The integrated circuit of claim 25, wherein at least one of the one or more learnable logic engines comprises circuitry for computing $w_0 \cdot a \cdot b + w_1 \cdot a + w_2 \cdot b + w_3$, wherein a, b are functions also dependent on input activations and $w_0$, $w_1$, $w_2$, $w_3$ are functions also dependent on the parameters.

43. The integrated circuit of claim 25, wherein at least one of the one or more learnable logic engines is configured to:

process a plurality N of input activations and a plurality M of output activation gradients, where N is an integer greater than or equal to two and M is an integer greater than or equal to one, and to generate a plurality N of input activation gradients, through S learnable logic gate operations, where S is an integer greater than or equal to one.

44. The system claim 25, wherein at least one of the learnable logic engines hardware-implements a learnable logic gate operator that realizes a differentiably parameterized selection of a logic gate operator from among a set of Boolean operations and wiring options, the learnable logic gate operator being implemented using at least one of polynomial computations, probabilistic relaxations, and fuzzy-logic operations.

45. An integrated circuit for training learnable logic networks, comprising:

memory configured to store activation values and parameter values of a learnable logic network; and one or more hardware-implemented learnable logic engines, at least one of the one or more learnable logic engines being configured to:

process a plurality N of input activations, where N is an integer greater than or equal to two, and to generate M output activations, where M is an integer greater than or equal to one, through S learnable logic gate operations, where S is an integer greater than or equal to one, wherein at least one of the one or more learnable logic engines utilizes a parameterization that non-linearly depends on a parameterization used by an optimization algorithm.

46. The integrated circuit of claim 45, wherein one or more learnable logic gate operations realize a parameterized relaxation of a choice of a logic operator from a set of at least two logic operators, including Boolean operations and wiring options, and wherein the Boolean operations and wiring options comprise at least one of: AND operators, OR operators, NAND operators, NOR operators, XOR operators, XNOR operators, inverter operators, and direct-connection operators.

47. The integrated circuit of claim 45, wherein at least one of the one or more learnable logic engines has at least three inputs and performs exactly one learnable logic gate operation.

48. An integrated circuit for training learnable logic networks, comprising:

memory configured to store activation values and parameter values of a learnable logic network; and one or more hardware-implemented learnable logic engines, at least one of the one or more learnable logic engines being configured to:

process a plurality N of input activations, where N is an integer greater than or equal to two, and to generate M output activations, where M is an integer greater than or equal to one, through S learnable logic gate operations, where S is an integer greater than or equal to one, wherein at least one of the one or more learnable logic engines has at least four inputs and performs at least two learnable logic gate operations.

49. The integrated circuit of claim 48, wherein one or more learnable logic gate operations realize a parameterized relaxation of a choice of a logic operator from a set of at least two logic operators, including Boolean operations and wiring options, and wherein the Boolean operations and wiring options comprise at least one of: AND operators, OR operators, NAND operators, NOR operators, XOR operators, XNOR operators, inverter operators, and direct-connection operators.

* * * * *